US012736606B2

(12) United States Patent
Katz

(10) Patent No.: US 12,736,606 B2
(45) Date of Patent: Sep. 15, 2026

(54) TRACKING A MOVING RADIO BEACON

(71) Applicant: Daniel A. Katz, Kiryat Ono (IL)

(72) Inventor: Daniel A. Katz, Kiryat Ono (IL)

( * ) Notice: Subject to any disclaimer, the term of this patent is extended or adjusted under 35 U.S.C. 154(b) by 710 days.

(21) Appl. No.: 18/108,081

(22) Filed: Feb. 10, 2023

(65) Prior Publication Data

US 2024/0272264 A1 Aug. 15, 2024

(51) Int. Cl.

| | |
|---|---|
| ***G01S 5/02*** | (2010.01) |
| ***G01S 5/00*** | (2006.01) |
| ***G01S 5/06*** | (2006.01) |
| *G01S 1/24* | (2006.01) |

(52) U.S. Cl.
CPC .......... *G01S 5/0249* (2020.05); *G01S 5/0063* (2013.01); *G01S 5/06* (2013.01); *G01S 1/24* (2013.01); *G01S 5/0294* (2013.01)

(58) Field of Classification Search
CPC ........ G01S 5/0294; G01S 5/06; G01S 5/0063; G01S 5/02; G01S 1/0428; G01S 1/24; G01S 1/00; G01S 1/08
USPC ................................ 342/450, 451, 386, 417
See application file for complete search history.

(56) References Cited

U.S. PATENT DOCUMENTS 7,292,187 B2 * 11/2007 Recker ..................... G01S 5/14 342/463
7,711,375 B2 * 5/2010 Liu .......................... G01S 5/06 455/457
8,026,850 B2 * 9/2011 Seong ....................... G01S 5/14 342/387
9,709,656 B2 * 7/2017 Katz ......................... G01S 3/14
11,774,547 B2 * 10/2023 Knuuttila ............ G01S 5/02585 455/456.1
12,253,614 B2 * 3/2025 Katz ......................... G01S 5/12
12,392,861 B2 * 8/2025 Svendsen ............ H04W 64/003
2007/0236389 A1 * 10/2007 Lommen ................ G01S 11/10 342/465
2016/0054425 A1 * 2/2016 Katz ......................... G01S 3/14 342/417
2018/0176729 A1 * 6/2018 Mycek ................. H04W 4/021

* cited by examiner

*Primary Examiner* — Chuong P Nguyen

(57) ABSTRACT

A method and devices are disclosed, for tracking a moving radio beacon by a mobile device, requiring no GNSS service. According to the disclosed method, the beacon is configured to periodically broadcast short RF signals, reporting its momentary acceleration, relatively to its own coordinate system, possibly different than the mobile device coordinate system, and the mobile device is configured to detect said signals, and use said acceleration report, along with other measurements of these signals, specifically: the Difference in Time of Arrival (DToA) or Difference in Angle of Arrival (DAoA), or Angle of Arrival (AoA), to determine the direction and distance from the mobile device to the beacon. According to a preferred embodiment of the present invention, the beacon is a Bluetooth Low Energy (BLE) tag comprising an accelerometer, configured to perform Bluetooth advertising, and the mobile device is a Bluetooth enabled smartphone.

20 Claims, 13 Drawing Sheets

Localization of moving beacon according to 1st embodiment

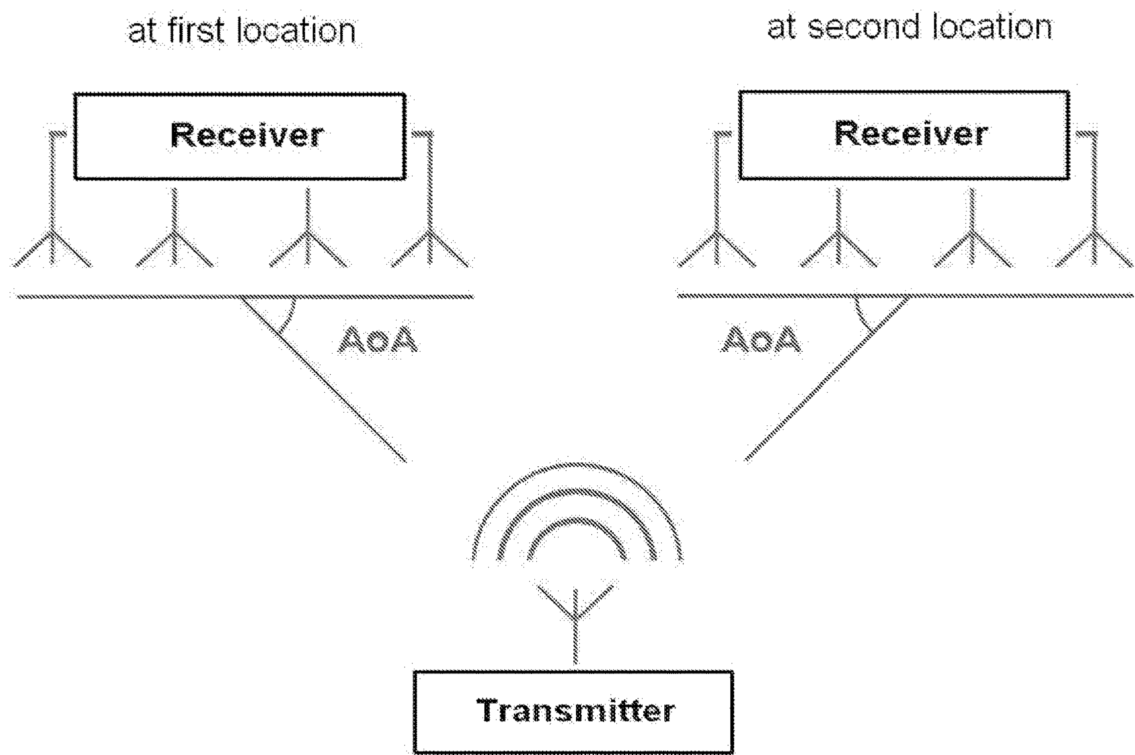
Figure 1 - Angle of Arrival (AoA) Method
according to present art
at first location
at second location
Receiver
Receiver
AoA
AoA
Transmitter

Figure 2 – LOP of static radio beacon based on DTOA according to US patent application 17,972,716
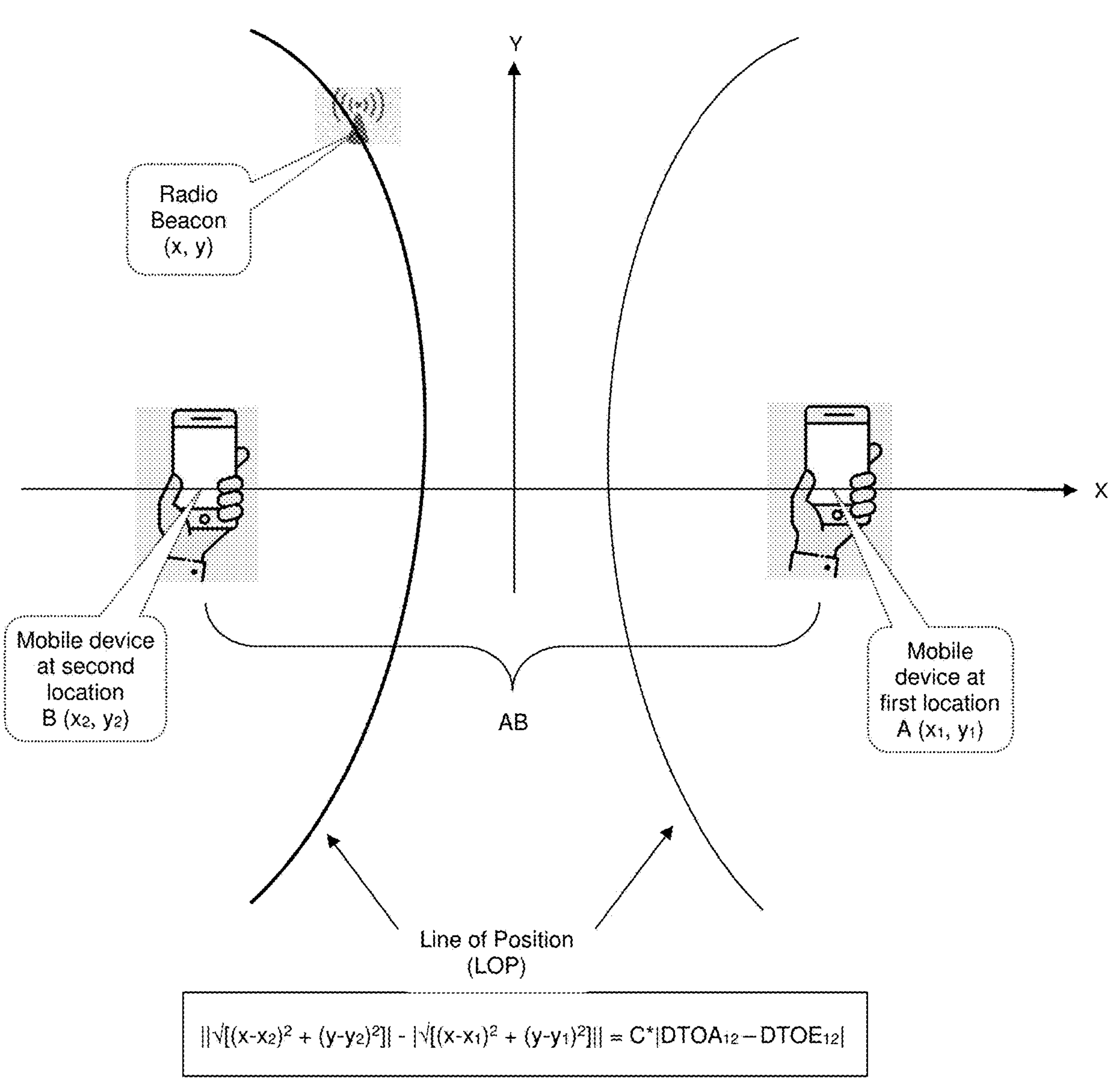

Figure 3 – LOP of static mobile device based on DTOA measurements of moving beacon signals
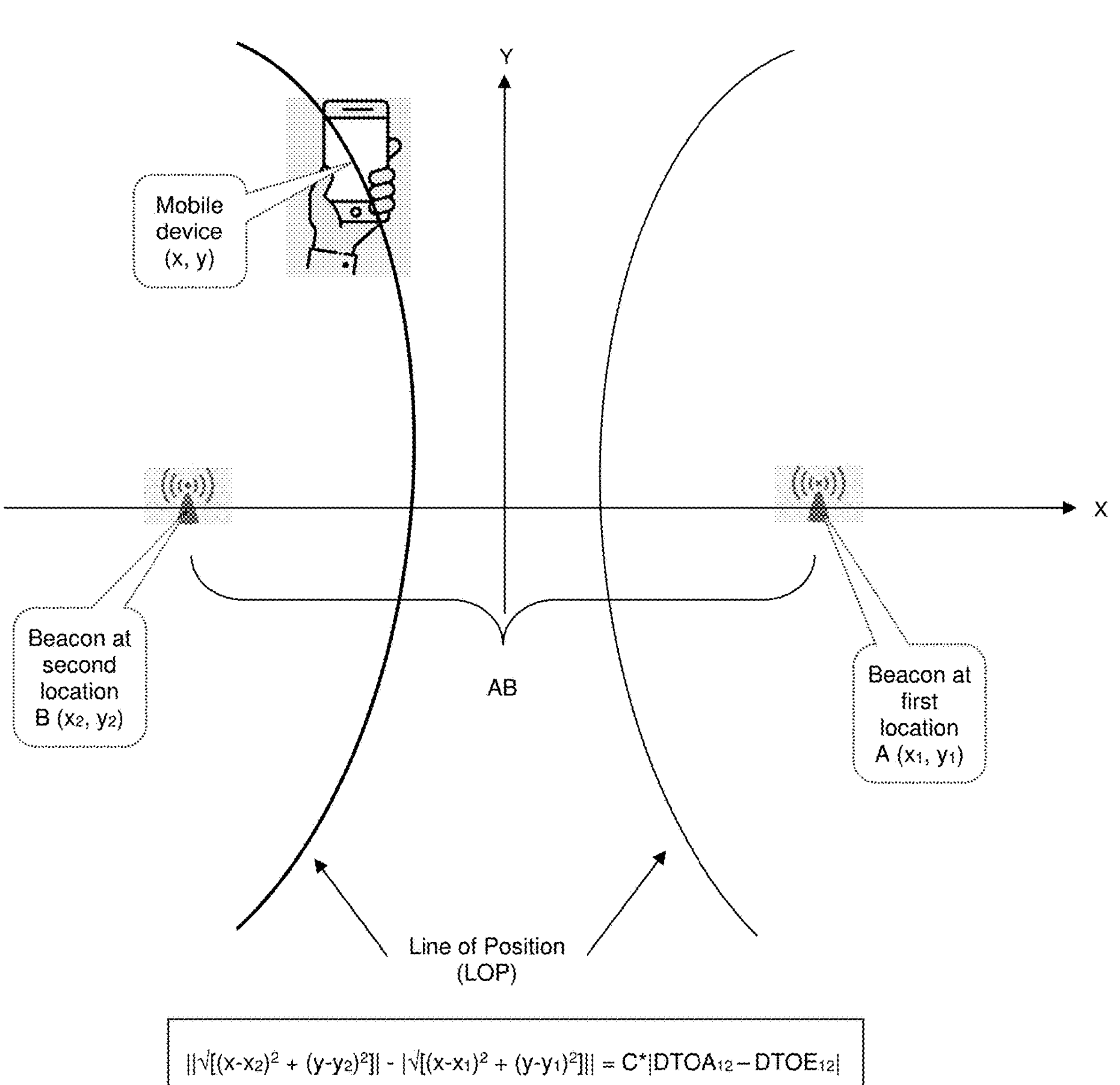

Figure 4 – Localization of moving beacon according to 1st embodiment
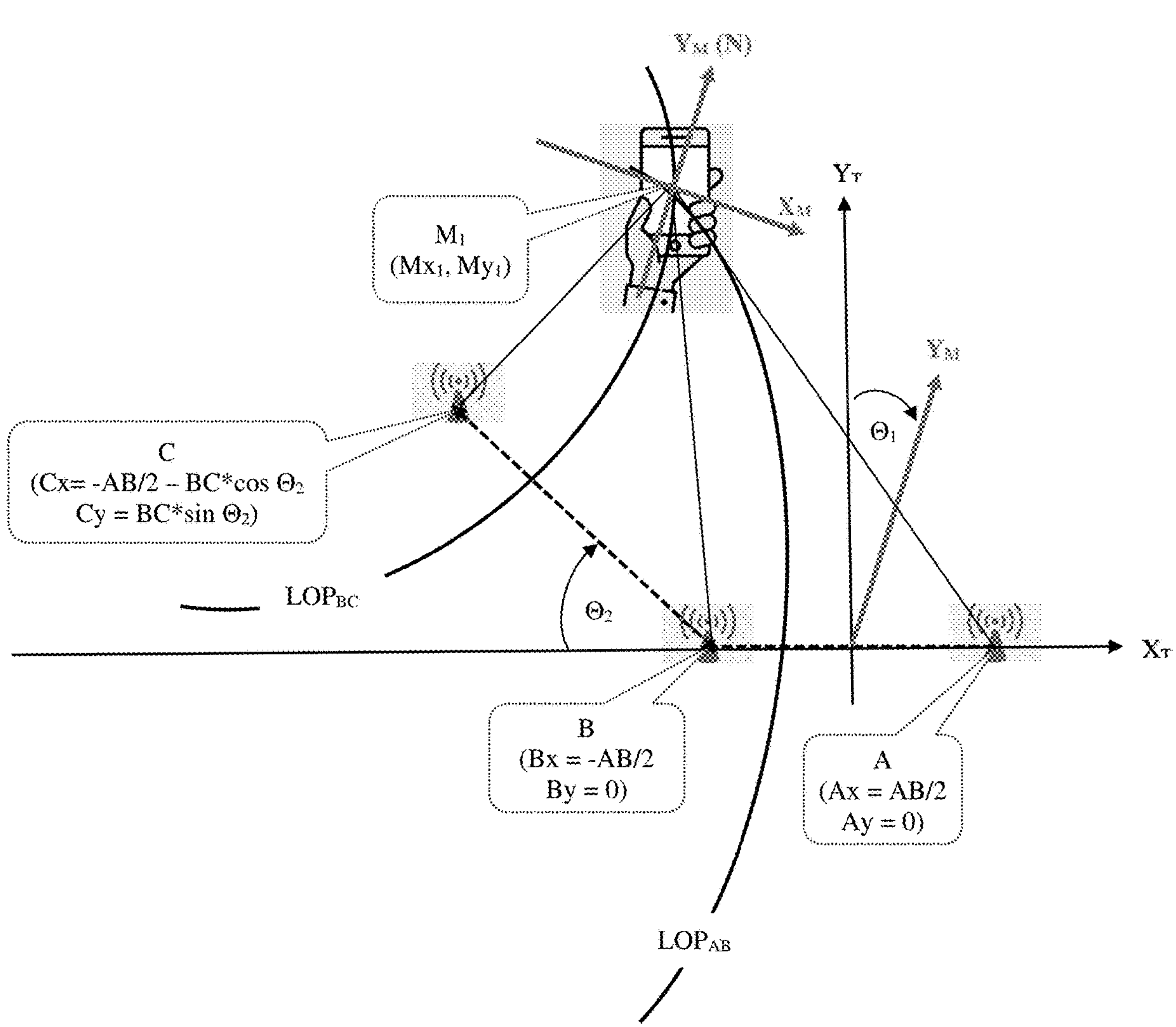

Figure 5 – Localization of moving beacon according to 2nd embodiment
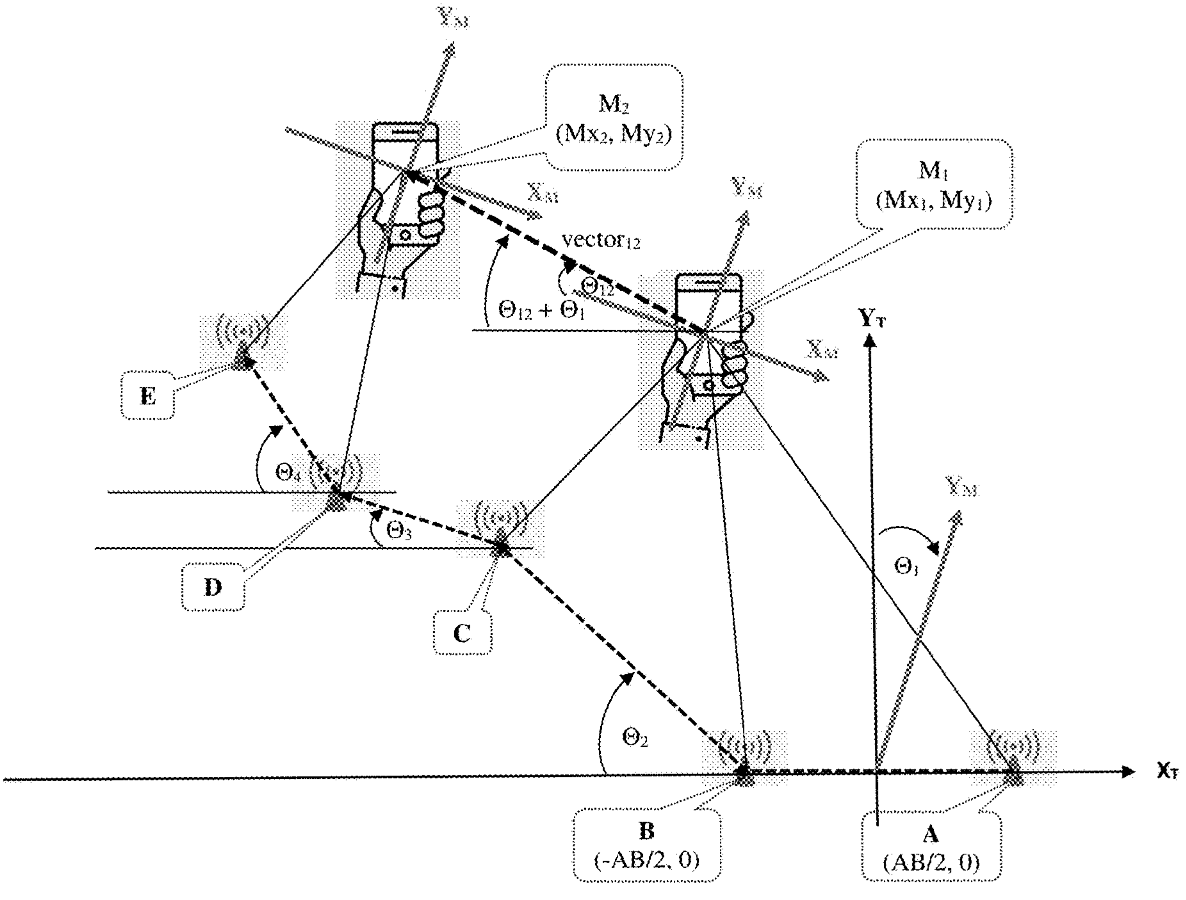

Figure 6 – Localization of moving beacon according to 3rd embodiment
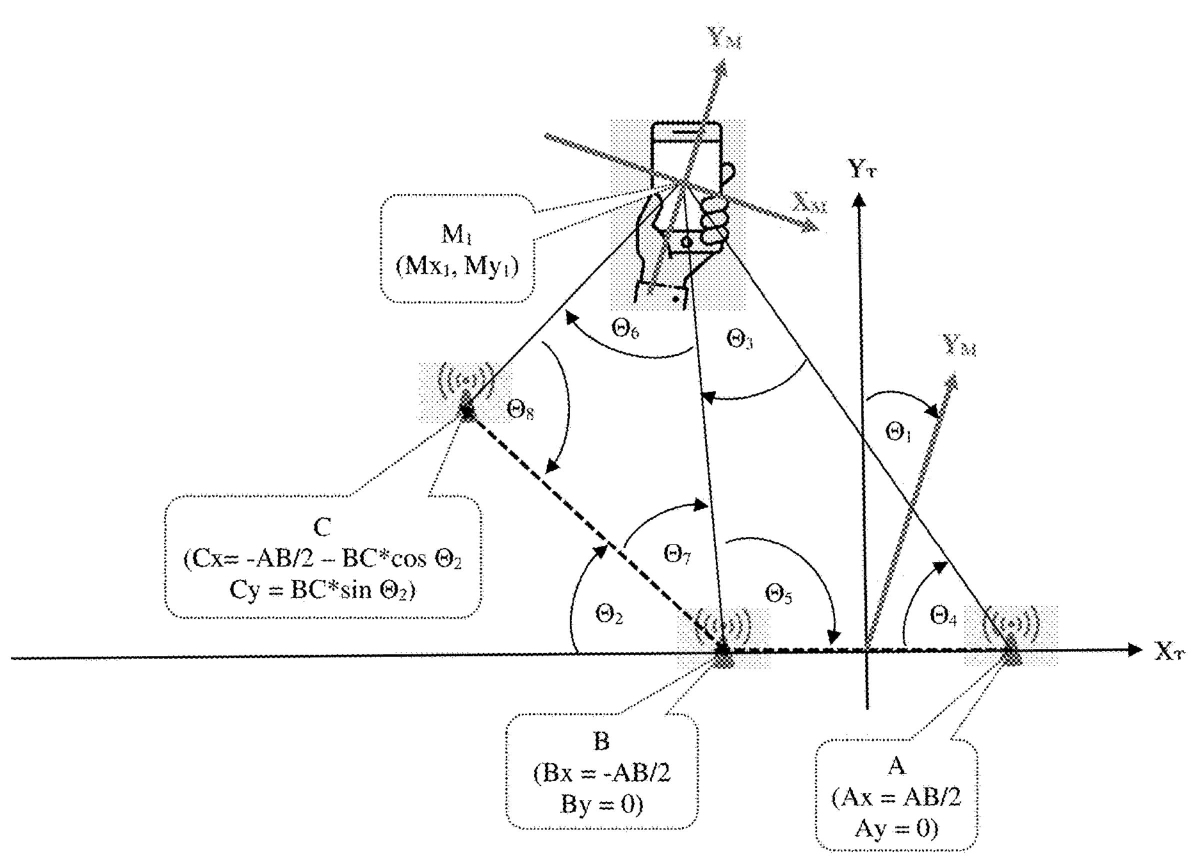

Figure 7 – Localization of moving beacon according to 4th embodiment
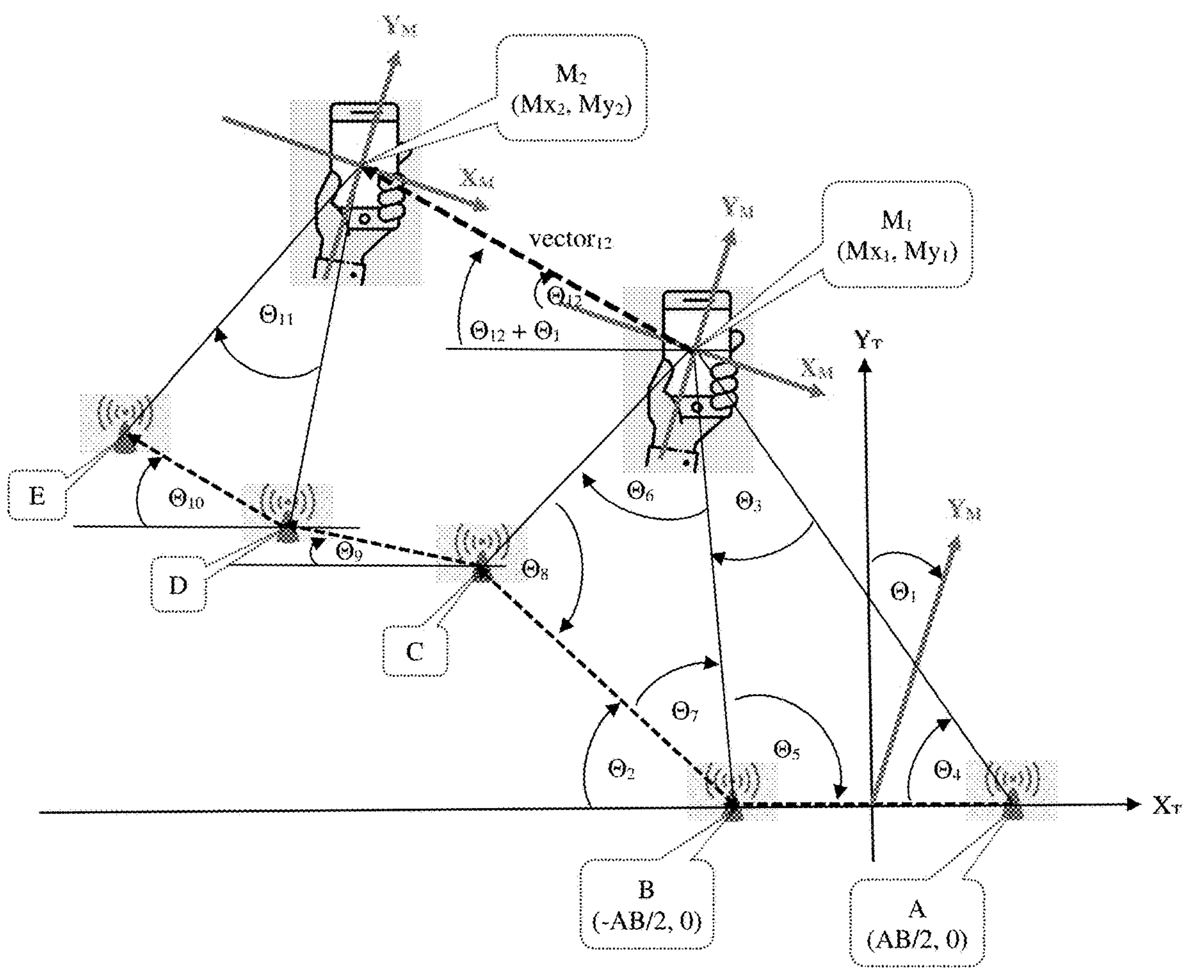

Figure 8 – Localization of moving beacon according to 5th embodiment
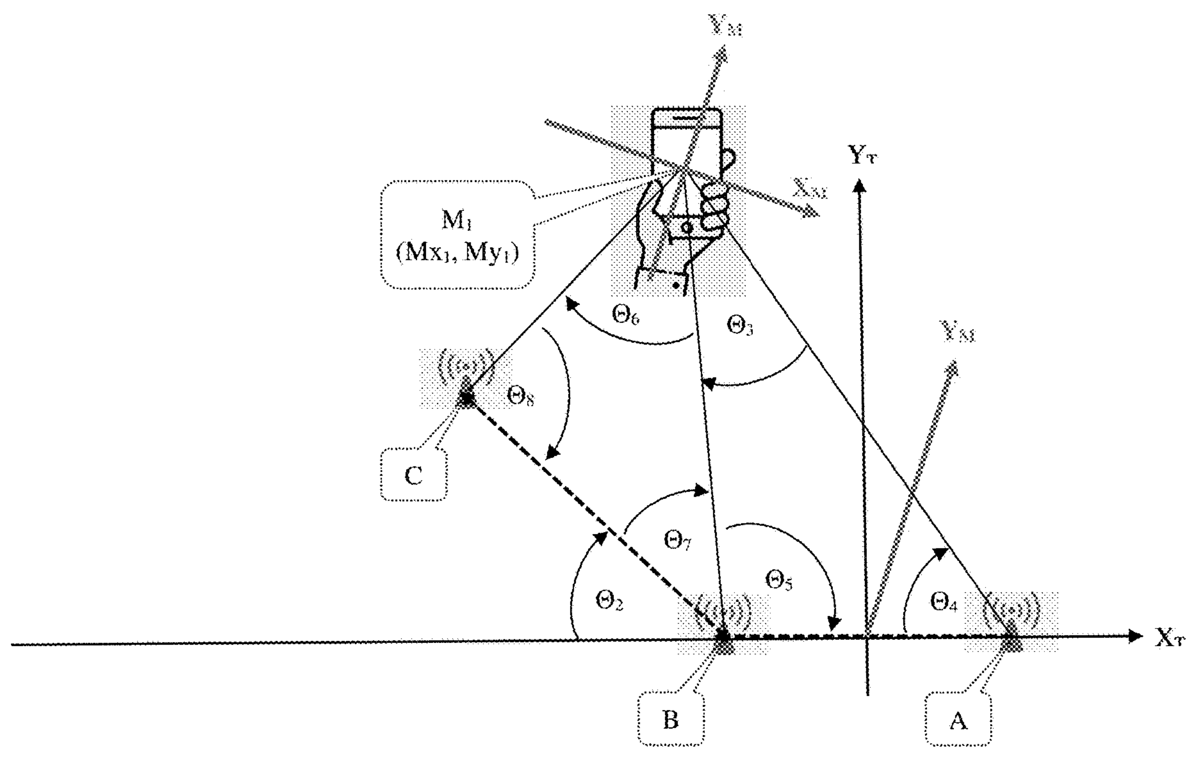

Figure 9 – Display at mobile device tracking a beacon according to preferred embodiment
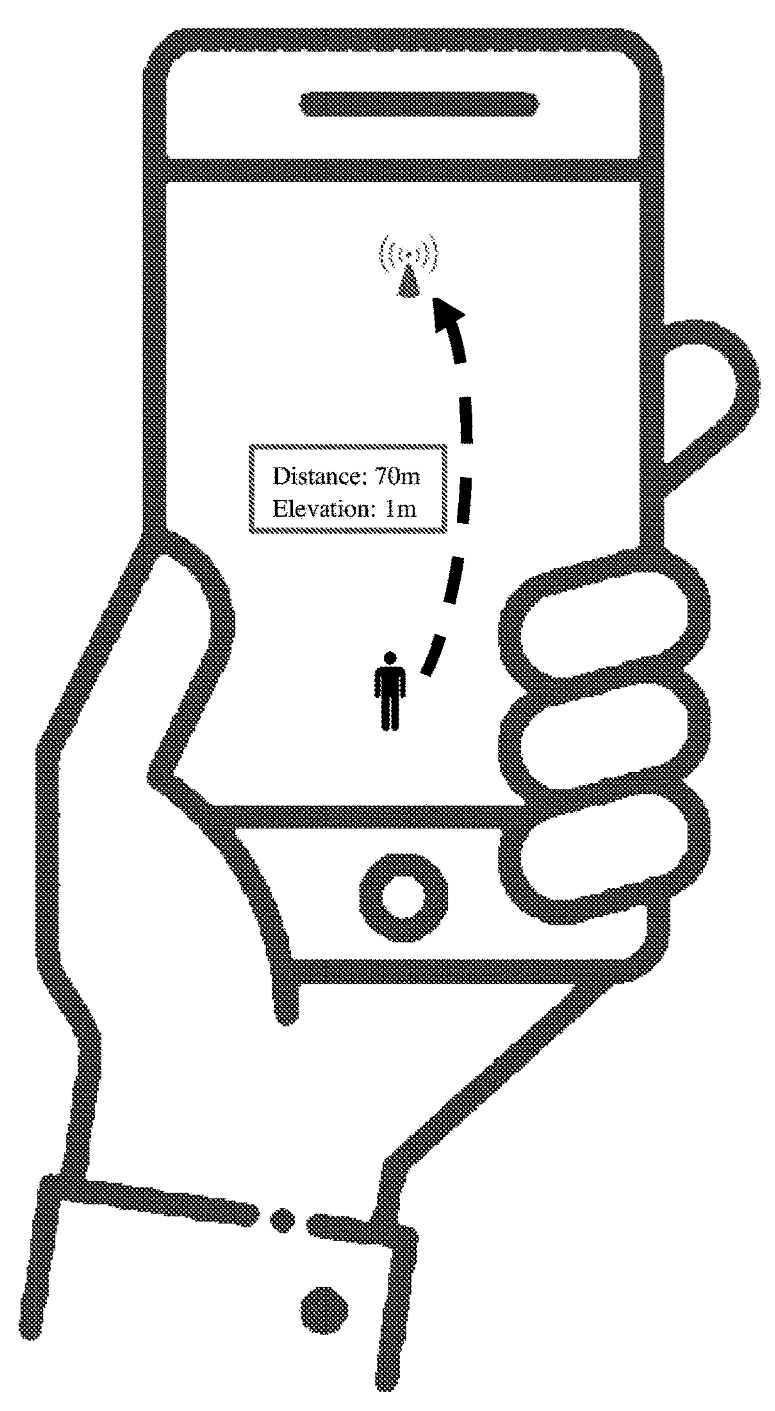

Figure 10 – Block Diagram of radio beacon according to preferred embodiment
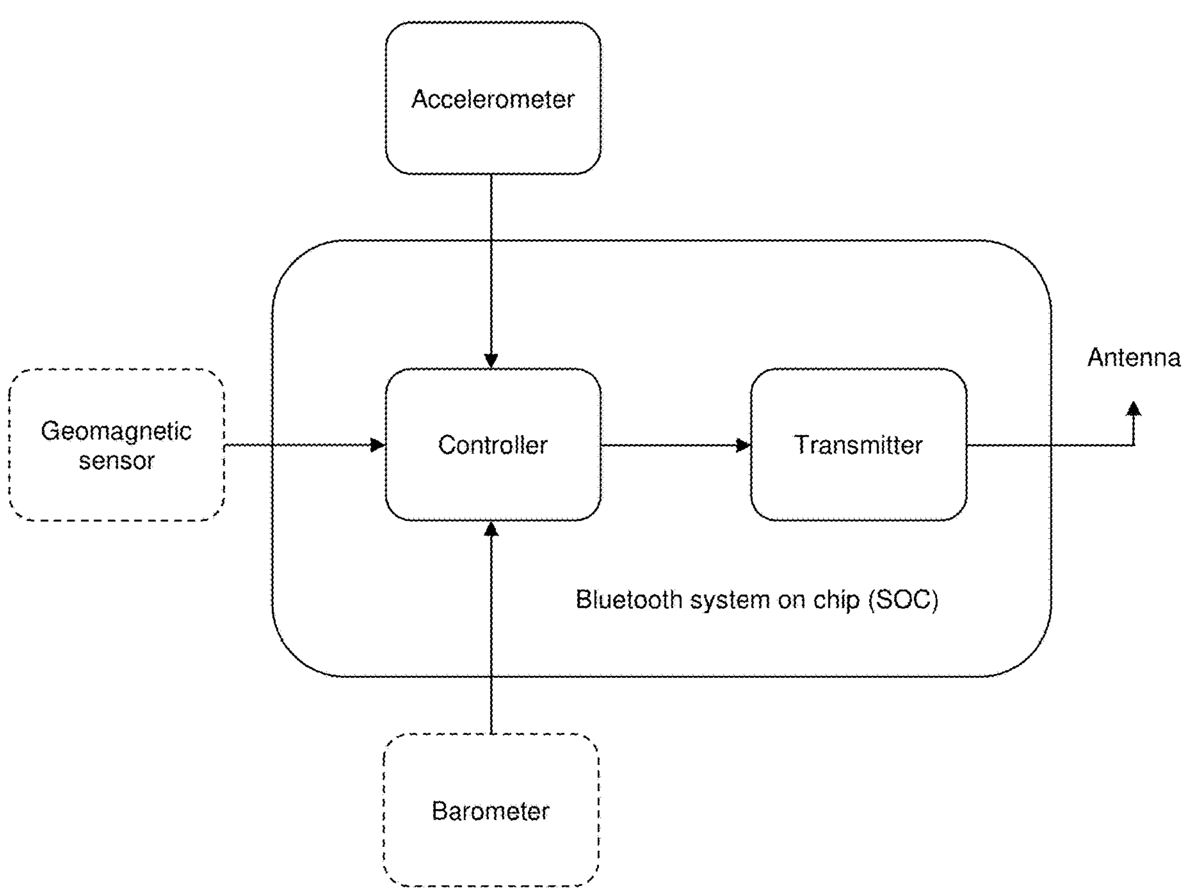

Figure 11 – Block Diagram of mobile tracking device according to preferred embodiment
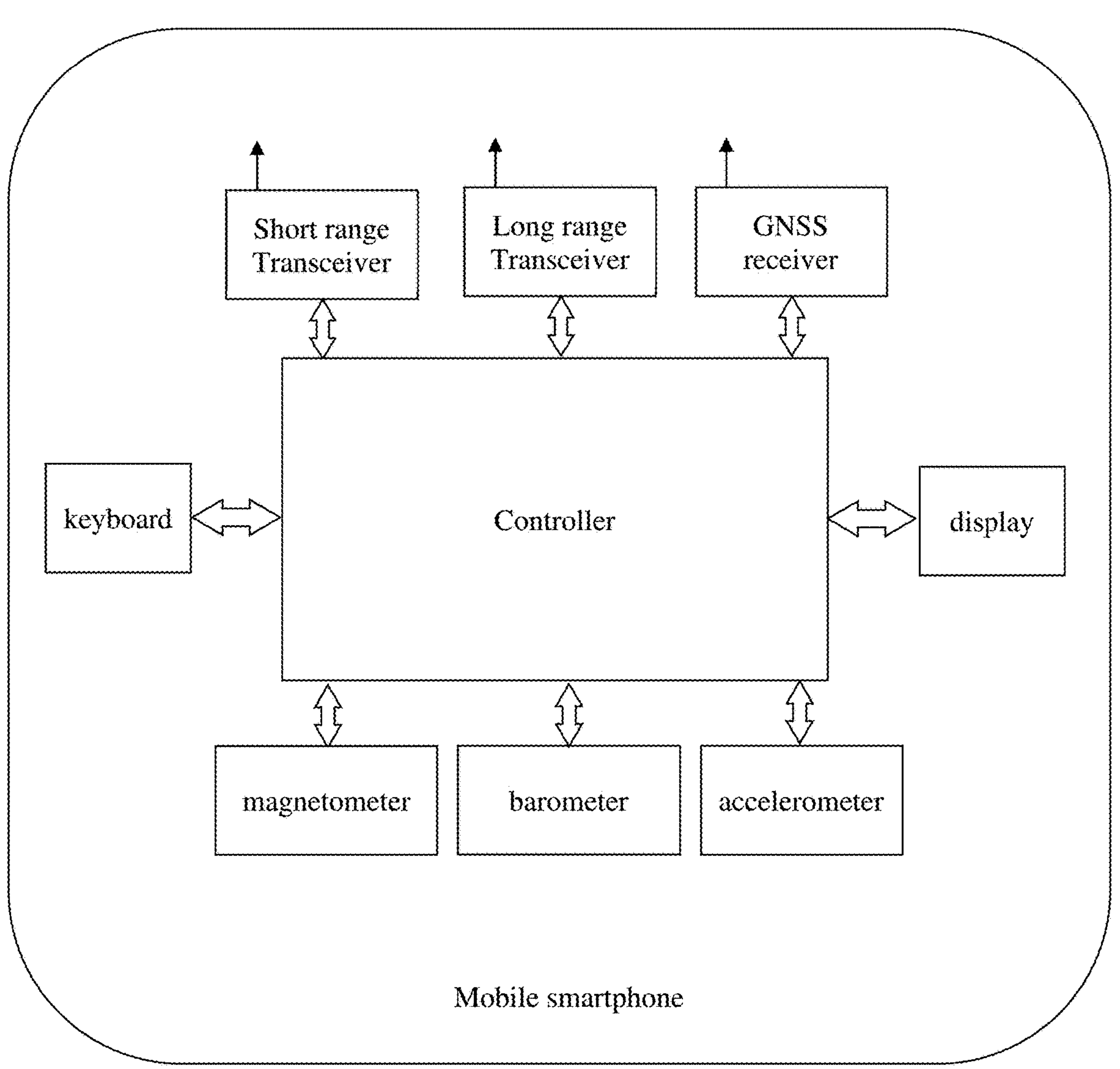

Figure 12 - transmitted signal
according to a preferred embodiment of the present invention
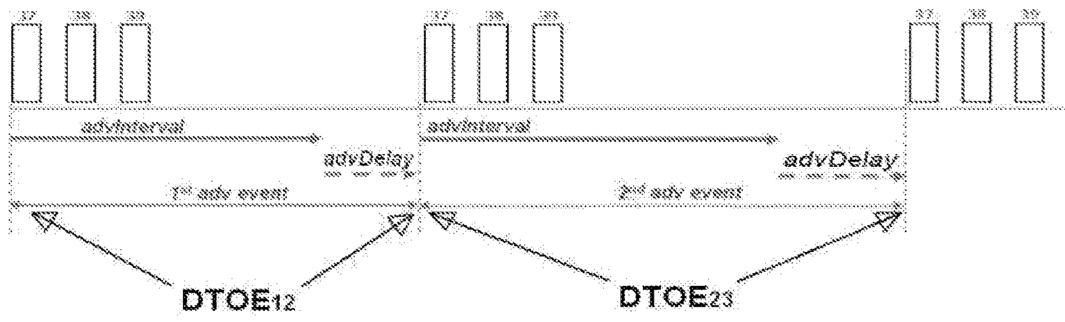
- *37, 38, 39 mean Primary Advertising* channels which are at 2402, 2426, 2480Mhz.
- *advInterval* shall be an integer multiple of 0.625 ms in the range of 20 ms to 10,485.759375s
- The *advDelay* is a pseudo-random value with a range of 0 ms to 10 ms generated by the Link Layer for each advertising event.

Figure 13 -
Constant Tone Extension
according to a preferred embodiment of the invention
RF phase = 0deg at rising edge of 1st preamble bit
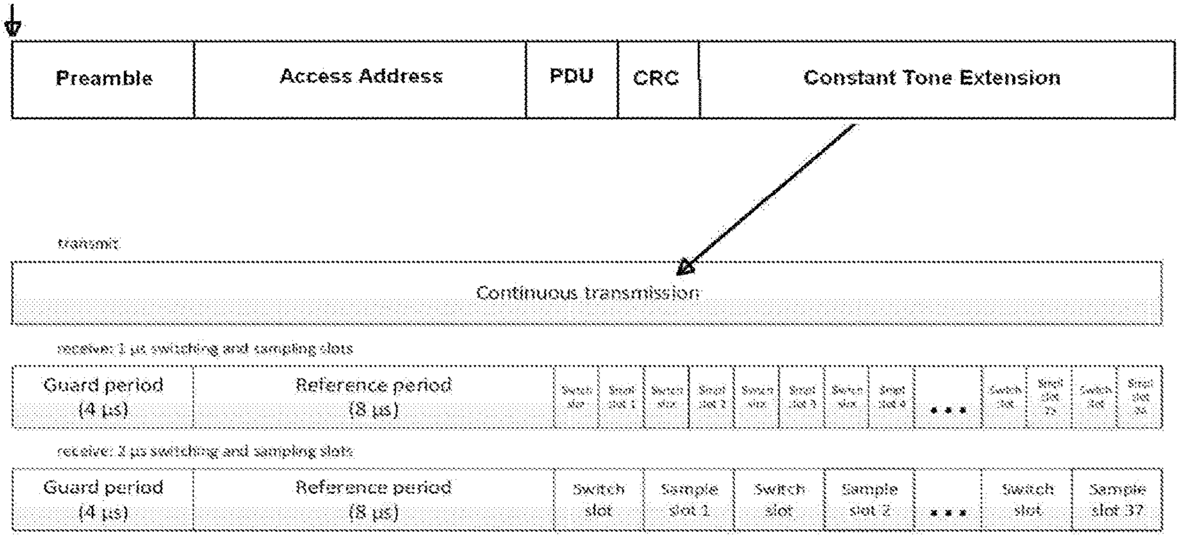

TRACKING A MOVING RADIO BEACON

BACKGROUND OF THE INVENTION

The present invention relates to the general art of wireless communications and particularly radio navigation and radio direction finding, and more specifically: tracking or locating radio beacons.

A radio beacon is a device deployable at a certain area allowing direction-finding equipment to find relative bearing. Radio beacons transmit electromagnetic radiation in the radio wave band. They are used outdoor, at large areas, to geolocate ships, aircraft, vehicles and individuals, sometimes assisted by satellites, and also in small areas, even indoor, for example to find a lost suitcase in the airport.

Radio beacons have many applications, including air and sea navigation, propagation research, robotic mapping, radio-frequency identification (RFID), near-field communication (NFC) and indoor navigation, real-time locating systems (RTLS) and mapping.

Radio beacons could also be associated with the Internet of things (IoT), referring to physical objects (or groups of such objects) with sensors, processing ability, software, and other technologies that connect and exchange data with other devices and systems over the Internet or other communications networks. Actually, such IoT devices do not need to be connected to the public internet, they only need to be connected to a network and be individually addressable or detectable.

Distress radio beacons, also collectively known as distress beacons, emergency beacons, or simply beacons, are those tracking transmitters that operate as part of the international Cospas-Sarsat Search and Rescue satellite system. When activated, these beacons transmit a 406 MHz signal that when detected by satellites, can be located by triangulation, or by a GPS position encoded into the signal. For the last mile homing, distress beacons emit low power signals at 121.5 MHz, unfortunately encoding no specific ID or position information, due to legacy interoperability restrictions, thus, the homing, i.e. tracking of this signal is usually done with directional antennas.

Wi-Fi (wireless local area networks using the IEEE 802.11b and 802.11g specification) beacons are wireless access points (AP) with specific data transmission capabilities, which do not contain the link layer address of another Wi-Fi device, therefore can be received by any LAN client.

Bluetooth is a short-range wireless technology standard used for exchanging data between fixed and mobile devices over short distances. It employs UHF radio waves in the ISM bands, from 2.402 GHz to 2.48 GHz. Bluetooth is managed by the Bluetooth Special Interest Group (SIG), which oversees development of the specification, manages the qualification program, and protects the trademarks. A network of patents apply to the technology, which are licensed to individual qualifying devices. In 2021, shipments of Bluetooth devices reached 4.7 billion units, with 9% growth forecast.

Bluetooth Low Energy (Bluetooth LE, colloquially BLE, formerly marketed as Bluetooth Smart) is a wireless personal area network technology designed and marketed by the Bluetooth SIG aimed at novel applications in the healthcare, fitness, beacons, security, and home entertainment industries. It is independent of classic Bluetooth and has no compatibility, but Bluetooth Basic Rate/Enhanced Data Rate (BR/EDR) and LE can coexist. Originally named Wibree, it was integrated into Bluetooth 4.0 in December 2009 as Bluetooth Low Energy.

Compared to Classic Bluetooth, Bluetooth Low Energy is intended to provide considerably reduced power consumption and cost while maintaining a similar communication range, so is ideal for small and low cost radio beacons. Mobile operating systems including iOS, Android, Windows Phone and BlackBerry, as well as macOS, Linux, Windows 8, Windows 10 and Windows 11, natively support Bluetooth Low Energy.

Bluetooth beacons are hardware transmitters—a class of Bluetooth Low Energy (LE) devices that broadcast their identifier to nearby portable electronic devices. The technology enables smartphones, tablets and other devices to perform actions when in close proximity to a beacon.

Bluetooth advertising is a method of mobile marketing that utilizes Bluetooth technology to deliver content such as message, information or advertisement to mobile devices such as cellular phones or tablet computer. Bluetooth advertising can also be received via laptop or PDA. Bluetooth advertising generally is a broadcast function. As with all wireless transmission, the range and accessibility to most Bluetooth advertising depends on the transmitter power class and the individual portage of the receiver equipment. However, with advances in mobile devices technology, this distance for proper receiving is increasing to reach 250 meters or more in nowadays smart phones, tablet computers and other mobile devices. Therefore, Bluetooth advertising is typically adopted in BLE beacons.

In Bluetooth, and particularly Bluetooth advertising, there are two types of possible communications: Broadcasting or Connection. Broadcasting doesn't need pairing (connection). Broadcaster will send data along with its ID and any receiver can receive it by recognizing that ID. Therefore, broadcasting Bluetooth advertising, without pairing with tracking devices, is quite useful for BLE beacons.

One application of Bluetooth beacons is an indoor positioning system, which helps smartphones determine their approximate location or context. With the help of a Bluetooth beacon, a smartphone's software can approximately find its relative location to a nearby Bluetooth beacon. Retail stores use the beacons for mobile commerce, offering customers special deals through mobile marketing, and can enable mobile payments through point-of-sale systems.

Bluetooth beacons differ from some other location-based technologies as the broadcasting device (beacon) is only a 1-way transmitter to the receiving smartphone or receiving device, and necessitates a specific app installed on the device to interact with the beacons. Thus, only the installed app, and not the Bluetooth beacon transmitter, can track users.

Bluetooth beacon transmitters come in a variety of form factors, including small coin cell devices and USB sticks.

AirTag is a specific type of Bluetooth beacon for tracking device, and iBeacon is a protocol associated with the Airtag, both beacon and protocol developed by Apple. AirTag is designed to act as a key finder, which helps people find personal objects (e.g. keys, bags, apparel, small electronic devices, vehicles). In addition to the 2.4 GHz Bluetooth, Airtag obtains two other communication capabilities: UWB (ultra-wideband) at 6.5-8 GHz and NFC (near field communication) at 13.56 MHz. Due to transmission power and frequency, the tracking range of the AirTag UWB is about 5 meters, and the NFC range is typically less than 5 cm. The Bluetooth communication range is much higher, typically about 100 m (at transmission power of 5-10 dBm) or even more, however presently at this range there is no accurate location determination, just an indication that the AirTag is in range of the tracking device, usually a Bluetooth enabled iPhone or iPad.

It is therefore an object of the present invention to enable accurate tracking of a radio beacon, including Bluetooth and BLE beacons, also known as Bluetooth tags, including AirTag and similar tags, through its entire communication range.

Geolocation (aka localization or remote location determination or tracking) of radio beacons, can be done in various ways. For outdoor applications, embedding a GNSS (Global Navigation Satellite System, such as: GPS, Galileo, Glonass, Beidou, etc.) receiver in a radio beacon and reporting the acquired GNSS position via RF channels is quite popular, since state of the art GNSS receivers are small, low power consuming and low cost. Therefore, GNSS receivers are popular in distress beacons.

Another geolocation method, particularly popular indoor, is based on the measurement of the angle of arrival (AOA) or angle of departure (AOD) of the beacon signals, using directional antennas or antenna arrays, as illustrated in FIG. 1. In the Angle of Arrival method, a transmitting device, such as a small asset tag, uses a single antenna to transmit a special signal. The receiving device, such as a fixed locator installed in a warehouse, has multiple antennas arranged in an array. As the transmitted signal crosses the array, the receiving device collects data enabling it to calculate signal direction. Combing measurements of two such antenna arrays provide the transmitter's relative location, in 2D (two dimensional, i.e., planar).

It is possible to employ AOA at a mobile device coupled to an antenna array, even with just two antennas, however this will require a more complex design of the mobile, with tougher than usual electronical and mechanical constrains.

Therefore, it is another object of the present invention to enable accurate geolocation of a beacon by a single tracking device, using a single omnidirectional antenna at the beacon and at the mobile device.

Furthermore, even with an antenna array, a mobile device might be able to acquire the AOA of a beacon signal, and accordingly perform direction finding (DF), however fixing the beacon position will require two such DF readings, at which the beacon is fixed and the tracking device changes positions, thus this method is limited to static beacons.

Thus, it is another object of the present invention to enable accurate geolocation of a dynamic beacon, by a single tracking device.

Theoretically, the distance to a transmitting beacon can be made by communicating the signal transmission power, and measuring its received power at the tracking device, then calculating the path loss, and deriving from this path loss the range between beacon and tracking device, using the FRIIS formula. However, ranging based on RF power measurement is usually inaccurate, since the RF signal propagation is attenuated not only due to range but also due to obstacles and multipath, present at the tracking site. For example, in the Bluetooth frequency of 2.4 GHz, a path loss of 80 dB could indicate 100 m range, or 50 m range+concrete wall between beacon and tracking device.

It is therefore another object of the present invention to enable accurate positioning of a beacon at a tracking device, insensitive to obstacles in the tracking site.

U.S. Pat. No. 9,709,656 by Katz, for Tracking A Radio Beacon From A Moving Device, discloses a method and devices for tracking a radio beacon from a moving device, based on difference in time of arrival (DTOA) measured at the tracking device, of periodic signals emitted by the beacon at a known difference in time of emission (DTOE). This method is effective outdoor, however since it involves GNSS positioning at the tracking device, it is not practical indoor.

It is therefore also an object of the present invention to enable accurate positioning of a beacon by a tracking device, indoor, independent of GNSS.

Another shortcoming of U.S. Pat. No. 9,709,656 is that DTOE is estimated at the tracking device based on a predefined timing, which the beacon obeys, but does not address the possibility that the beacon will change this timing on the fly. Such timing alteration could well be present in Bluetooth advertising, wherein the time interval between advertising events, is actually required by the Bluetooth standard, to obtain a pseudo-random pattern.

Therefore, it is a further object of the present invention to enable employing DTOA with pseudo random DTOE.

U.S. patent application Ser. No. 17/972,716 by Katz, for Tracking a Radio Beacon Indoor, discloses a method and devices for tracking a radio beacon at a mobile device, using short range RF signals, emitted by the beacon and detected at the mobile device, typically indoor, requiring no GNSS service. According to the disclosed method, the beacon is configured to broadcast short bursts, at a carefully structured difference in time of emission (DTOE), while at the tracking device, the difference in time of arrival (DTOA) of said signals is measured, and along with the DTOE, used to accurately determine the location of and direction to the beacon relatively to the tracking device.

However, the method disclosed in U.S. patent application Ser. No. 17/972,716 is not practical for dynamic beacons, since even determining a single Line of Position (LOP) requires the mobile device to move between two points, while the beacon is static, as illustrated in FIG. 2.

Theoretically, the method disclosed in U.S. patent application Ser. No. 17/972,716 could be further modified, to determine a LOP of the mobile device, measuring signals broadcast by a beacon moving between two locations, as illustrated in FIG. 3, but since the position of the beacon ($x_1$, $y_1$) and then ($x_2$, $y_2$) in FIG. 3, is unknown to the mobile device, this LOP could be hardly determined in the mobile coordinate system.

Hence, it is another object of the present invention to enable tracking a moving radio beacon/Bluetooth tag, from a mobile device.

U.S. Pat. No. 7,711,375 by Liu discloses a Method and system for determining a location of a wireless transmitting device and guiding the search for the same. Liu discloses determining the location of a wireless transmitting device using a movable detection station . . . measurements at a plurality of positions of said movable detection station . . . determining at least one of the location and orientation of said movable detection station at each of said positions . . . performing estimation of the location of said wireless transmitting device. Liu discloses measurement of delay of the signal propagation, from said wireless transmitting device to said movable detection station . . . measurement of difference of the signal propagation delays, from said wireless transmitting device to said movable detection station . . . wherein the difference of delays is between pairs of said positions of said movable detection station . . . .

U.S. Pat. Nos. 7,616,155 and 7,804,448 by Bull disclose Portable iterative geolocation of RF emitters. Bull discloses a method for locating an emitter of interest (EOI) using at least one portable geolocation sensor . . . receive, time stamp and store EOI transmissions during a first period of time; moving the first portable geolocation sensor to a second location; at the second location, using the first portable geolocation sensor to receive, time stamp and store EOI transmissions during a second period of time; and computing the location of the EOI using data representative of the EOI transmissions stored during said first and second periods of time . . . .

Yet Liu and Bull focus on outdoor localization, and fail to disclose transmission of periodic signals. Liu and Bull also fail to disclose communication of the time difference between transmissions (DTOE) to the tracking device, which is instrumental in combination with the time difference of arrival (DTOA). Liu and Bull also fail to disclose a method for determining the direction to the beacon.

Therefore, it is another object of the present invention to determine at the tracking device, the direction to the beacon, for instructing the user to efficiently approach and physically find the beacon.

U.S. patent application Ser. No. 17/338,006 by KNUUTTILA discloses a SELF-POSITIONING METHOD, SELF-POSITIONING SYSTEM AND TRACKING BEACON UNIT.

KNUUTTILA discloses a self-positioning system configured to estimate direction of arrival of a radio wave tracking beacon signal arriving at an antenna array of the vehicle from a non-stationary tracking beacon unit, estimate Euclidian distance between the self-positioning system and the tracking beacon unit by using wireless radio-frequency communication between the self-positioning system and the tracking beacon unit, and determine position data identifying a three-dimensional position of the self-positioning system with respect to tracking beacon unit on the basis of the estimates of the direction of arrival and the Euclidian distance. However, KNUUTTILA fails to disclose employing difference in time of arrival (DTOA) or difference in angle of arrival (DAOA) measures, and also fails to disclose transforming the data of the beacon movement, from the beacon coordinate system to the mobile coordinate system.

U.S. patent application Ser. No. 11/279,012 by Lommen discloses REFERENCE BEACON METHODS AND APPARATUS FOR TDOA/FDOA GEOLOCATION.

Lommen discloses estimating bias errors in a time-difference-of-arrival/frequency-difference-of-arrival (TDOA/FDOA) geolocation system using a reference signal transmitter in which position and/or motion information of the reference signal transmitter is encoded into the reference signal, particularly acceleration. The geolocation system estimates the position and/or velocity of the reference signal transmitter using conventional TDOA/FDOA techniques. The estimated position and/or velocity of the reference signal transmitter is compared to the information contained in the reference signal to estimate bias errors.

Yet, Lommen fails to disclose determining the distance and direction to the beacon, based on said communicated acceleration, and said measured at least one of: DToA or DAoA; and further fails to disclose Angle of Arrival (AOA) and particularly Difference in Angle of Arrival (DAOA) measures, and fails to disclose transforming the data of the beacon movement, from the beacon coordinate system to the mobile coordinate system.

Other objects and advantages of the invention will become apparent as the description proceeds.

SUMMARY OF THE INVENTION

The present invention discloses a method for tracking a radio beacon, by a mobile device, comprising the steps of:

a. at the radio beacon, defining the beacon coordinate system;
b. at the radio beacon, at each different location: location (A), location (B), and location (C), measuring a momentary acceleration relatively to the beacon coordinate system, and broadcasting a radio signal indicating said acceleration measurement;
c. at the mobile device, defining the mobile coordinate system;
d. at the mobile device, at location (M1), detecting the signals transmitted by the beacon from: location (A), location (B) and location (C), including the beacon acceleration measurement; and measuring at least one of: the Difference in Time of Arrival (DToA) or Difference in Angle of Arrival (DAoA) between these signals, or Time of Arrival (ToA) or Angle of Arrival (AoA) of these signals;
e. at the mobile device, transforming the acceleration measurement, from the beacon coordinate system to the mobile coordinate system;
f. at the mobile device, at location (M1), determining the distance and direction to the beacon, based on said beacon acceleration measurement, and on said measured at least one of: DToA or DAoA or ToA or AoA.

Preferably, the radio signals broadcast by the beacon are Bluetooth advertising signals, as typically employed nowadays in tags attached to keyholders, suitcases, cars and people, trackable by personal smartphones. As known in the art, Bluetooth advertising signals can be detected by compatible mobile devices in scan mode, not requiring pairing, therefore enabling 1-way communication, saving battery energy and communication traffic. This should not limit the embodiment of the present invention, whatsoever, though this scenario seems practical and convenient for explaining the invention.

Then, in order to enable the tracking device to accurately measure DToA or DAoA or ToA or AoA, the present invention discloses some methods to configure the advertising signals, not violating the standard, specifically detailed later.

According to the present invention, the beacon communicates its measured acceleration, including magnitude and direction of the acceleration, such that the mobile device could use, with other measurements, to determine the direction and distance to the beacon; then, different embodiments of the invention teach different formats of this communicated acceleration direction, particularly whether this direction is reported relatively to a coordinate system that the mobile device is aware of, typically employing the magnetic North as the reference direction, or the more complex case where the reference direction used by the beacon is unknown to the mobile device, so more measurements are needed at the mobile device to resolve this unknown.

According to a $1^{st}$ embodiment of the present invention, the beacon is a Bluetooth tag, specifically transmitting Bluetooth advertising signals, comprising accelerometer and magnetometer, such that its acceleration measurements are reported in the beacon local coordinate system, which rotation angle relatively to the mobile coordinate system is known. Further, at the mobile device, DTOA measurements are employed for localization of the beacon.

FIG. 4 illustrates a method for Localization of a moving beacon according to a $1^{st}$ embodiment of the present invention. In the background, two 2D cartesian coordinate systems are depicted: the beacon (tag) coordinate system ($X_T$-$Y_T$), its axes drafted in thin lines, and the mobile coordinate system ($X_M$-$Y_M$), its axes drafted in thicker lines. A beacon is depicted in locations: A, B and C, and a mobile device is depicted in location $M_1$.

Actually, the beacon coordinate system ($X_T$-$Y_T$) is defined after the beacon locations A and B, such that the $X_T$ axis is aligned with AB, and the $Y_T$ axis perpendicularly crossing the $X_T$ axis, at mid AB; such that, the mobile coordinate system ($X_M$-$Y_M$) is shifted by $My_1$ and $Mx_1$, and rotated clockwise by $\theta_1$, relatively to the beacon coordinate system ($X_T$-$Y_T$).

According to this $1^{st}$ embodiment, $Y_M$ is directed to the magnetic North, therefore the $Y_M$ axis is marked in FIG. 4 with (N). Also, according to this $1^{st}$ embodiment, the angle between $Y_M$ and $Y_T$, [$\theta_1$], is known, which practically means that the beacon comprises a magnetometer, and reports its acceleration direction relatively to the magnetic North.

So, according to the $1^{st}$ embodiment of the invention, the radio beacon coordinate system and the mobile device coordinate system are aligned (meaning that the two refer to a same reference direction, or that $\theta_1$ is known at the mobile device). Furthermore, at least one of (actually both, according to the $1^{st}$ embodiment): the beacon or the mobile device, regard the magnetic North as a reference direction.

Also depicted in this figure are two hyperbolic Lines of Position: $LOP_{AB}$ and $LOP_{BC}$, associated with DTOA measurements, correspondingly considering AB and BC as the hyperbola baseline. The equations that define these LOPs are drafted at the bottom of FIG. 3.

In other words, and still with respect to the $1^{st}$ embodiment and FIG. 4, angle $\theta_1$ between axes $Y_M$ and $Y_T$ is known at the mobile device, and consequently the acceleration direction reported by the beacon according to the beacon coordinate system, could be easily converted to a direction in the mobile coordinate system.

Preferably, the beacon radio signals are broadcast at a Difference in Time of Emission (DToE) selectable from a set of discrete values known or communicated to the mobile device, and furthermore, said DToE is changed from time to time in a pseudorandom pattern.

FIG. 12 illustrates the beacon signals according to $1^{st}$ embodiment of the present invention, compliant with the standard Bluetooth advertising specifications. At the upper side of the picture, three groups of three signals each are depicted by vertical grey colored rectangles marked by 37, 38, and 39. Each group of three signals defines an advertising event according to the Bluetooth standard, wherein the time difference between two consecutive advertising events is indicated as [advinterval+advDelay], and further down marked $DTOE_{12}$, and then $DTOE_{23}$, considering the different serial signals. As indicated in this picture, according to the Bluetooth specifications, advinterval is an integer multiple of 0.625 ms in the range 20-10,485,759.375 ms, and AdvDelay is a pseudo-random value with range 0-10 ms. Then, according to the $1^{st}$ embodiment of the invention, advinterval is set to 1 sec, and AdvDelay is set to m*0.625 ms, wherein m is an integer number with range 0-16, changed from one Bluetooth event to another, in a pseudo-random pattern. Consequently, DTOE is configured to [1000+m*0.625] ms, wherein m is an integer number changed pseudo randomly each transmission.

Still according to the $1^{st}$ embodiment of the invention, upon detecting the beacon signals transmitted from three locations: A, B, and C, the distances AB and BC are estimated at the mobile device by integrating the communicated acceleration magnitude, considering the estimated time of movement. Angle $\theta_2$ (in FIG. 4) can also be determined at the mobile device, as the difference between the acceleration direction reported in the signal transmitted from A, and the acceleration direction reported in the signal transmitted from B, even in the beacon coordinate system. Possibly, these determined distances and directions can be refined, using additional information acquired at the mobile device, either transmitted by the beacon or otherwise.

Then, upon measuring $DTOA_{AB}$ and $DTOA_{BC}$ at the mobile device, a set of equations can be drafted and resolved, as presented in the detailed description part of this disclosure.

Once the mobile position in the beacon coordinate system ($Mx_1$, $My_1$) is resolved, and knowing the rotation angle $\theta_1$ between the beacon and the mobile coordinate systems, the mobile can easily determine the distance and direction to the beacon in its own coordinate system.

The disclosed method may further comprise the steps of:

a. at the radio beacon, at each different location: location (D), and location (E), measuring a momentary acceleration relatively to the beacon coordinate system, and broadcasting a radio signal indicating said acceleration measurement;
b. at the mobile device, moving from location (M1) to location (M2), and measuring the distance and direction therebetween relatively to the mobile coordinate system;
c. at the mobile device, at location (M2), detecting the signals transmitted by the beacon from: location (D) and location (E), including the beacon acceleration measurement, and measuring at least one of: the Difference in Time of Arrival (DToA) or Difference in Angle of Arrival (DAoA) between these signals, or Time of Arrival (ToA) or Angle of Arrival (AoA) of these signals;
d. at the mobile device, at location (M2), determining the distance and direction to the beacon, based on the beacon acceleration measurement, and on the measured at least one of: DToA or DAoA or ToA or AoA.

According to a $2^{nd}$ embodiment of the present invention, the beacon is a Bluetooth tag, specifically transmitting Bluetooth advertising signals, comprising an accelerometer but no magnetometer, so its acceleration measurements are reported in the beacon local coordinate system, and the rotation angle between beacon and mobile coordinate systems is preliminarily unknown. Further, at the mobile device, DTOA measurements are employed for localization of the beacon.

FIG. 5 illustrates a method for Localization of a moving beacon according to a $2^{nd}$ embodiment of the present invention. In the background, two 2D cartesian coordinate systems are depicted: the beacon (tag) coordinate system ($X_T$-$Y_T$), drafted in thin lines, and the mobile coordinate system ($X_M$-$Y_M$), drafted in thicker lines. A beacon is depicted in locations: A, B, C, D, and E, and a mobile device is depicted in locations: $M_1$, and $M_2$.

Also, according to this embodiment, the beacon coordinate system ($X_T$-$Y_T$) is defined after the beacon locations A and B, such that the $X_T$ axis is aligned with AB, and the $Y_T$ axis perpendicularly crossing the $X_T$ axis, at the middle of AB, such that the mobile coordinate system ($X_M$-$Y_M$) is shifted by $My_1$ and $Mx_1$, and rotated clockwise by $\theta_1$, relatively to the beacon coordinate system ($X_T$-$Y_T$). However, according to the $2^{nd}$ embodiment, $\theta_1$ is preliminarily unknown.

The movement of the mobile device from $M_1$ to $M_2$ is depicted by a dotted line with arrow pointing on $M_2$, marked as $vector_{12}$, implying that it indicates a magnitude and a direction.

According to a $2^{nd}$ embodiment of the present invention, the beacon transmits Bluetooth advertising signals, DTOE configured to n*0.625 ms, n being an integer number with range 32-16,777,215, as illustrated in FIG. 12, and further configuring AdvDelay=m*0.625 ms, m being an integer number with range 0-16, selected pseudo randomly.

According to the $2^{nd}$ embodiment of the invention, upon detecting the beacon signals transmitted from locations: A, B, C, D, and E, the distances AB, BC, CD, and DE are estimated at the mobile device by integrating the communicated acceleration magnitude, considering the estimated time of movement. Then, angles $\theta_2$, $\theta_3$, and $\theta_4$ (in FIG. 5) can also be determined at the mobile device, based on the acceleration direction reported by the beacon, relatively to the beacon coordinate system, in signals transmitted from locations: A, B, C, D, and E.

In addition, $vector_{12}$, specifying the magnitude ($M_1M_2$) and direction ($\theta_{12}$) of the movement of the mobile device from $M_1$ to $M_2$, can be determined at the mobile device, relatively to the mobile coordinate system, based on measurements made at the mobile device using an internal accelerometer and magnetometer, according to this $2^{nd}$ embodiment.

Then, upon measuring $DTOA_{AB}$, $DTOA_{BC}$, and $DTOA_{DE}$, at the mobile device, and assessing $DTOE_{AB}$, $DTOE_{BC}$, and $DTOE_{DE}$, a set of equations can be drafted and resolved, as presented in the detailed description part of this disclosure.

Apparently, since DTOE=[1000+m*0.625] ms, wherein m is an integer number unknown to the mobile device, DTOE is not defined unequivocally, so the resolution seems ambiguous; however, since at the speed of light RF signals travel 187.5 Km in 0.625 ms, this ambiguity can be easily removed, considering shorter distances between the beacon and the mobile device. If this range is larger, there are other ways to remove the ambiguity, known in the art.

Once been resolved: the mobile position ($Mx_1$, $My_1$), and the rotation angle ($\theta_1$) between the beacon and the mobile coordinate systems, the mobile device can easily determine the distance and direction to the beacon in its own coordinate system.

According to a $3^{rd}$ embodiment of the present invention, the beacon is a Bluetooth tag, specifically transmitting Bluetooth advertising signals, comprising accelerometer and magnetometer, such that its acceleration measurements are reported in the beacon local coordinate system, which rotation angle relatively to the mobile coordinate system is known. Further, at the mobile device, DAOA measurements are employed for localization of the beacon, using a single omnidirectional antenna.

FIG. 6 illustrates a method for Localization of a moving beacon according to a $3^{rd}$ embodiment of the present invention. In the background, two 2D cartesian coordinate systems are depicted: the beacon (tag) coordinate system ($X_T$-$Y_T$), drafted in thin lines, and the mobile coordinate system ($X_M$-$Y_M$), drafted in thicker lines. A beacon is depicted in locations: A, B, and C, and a mobile device is depicted in location: $M_1$.

Also, according to this embodiment, the beacon coordinate system ($X_T$-$Y_T$) is defined after the beacon locations A and B, such that the $X_T$ axis is aligned with AB, and the $Y_T$ axis perpendicularly crossing the $X_T$ axis, at the middle of AB, such that the mobile coordinate system ($X_M$-$Y_M$) is shifted by $My_1$ and $Mx_1$, and rotated clockwise by $\theta_1$, relatively to the beacon coordinate system ($X_T$-$Y_T$).

Preferably, the Bluetooth advertising signals broadcast by the beacon, are configured to contain an unmodulated part, or a part modulated according to a predefined pattern, enabling the mobile device to measure at least one of: DAoA or AoA. Practically, for that purpose, the Constant Tone Extension (CTE) defined in the Bluetooth specifications and known in the art can be used. The purpose of CTE is to provide part of the message with constant frequency such that could be sampled at the scanning receiver, employing IQ sampling, a technique that is also defined in the Bluetooth specifications and well known in the art, typically used to measure the RF phase difference between two sampled signals. This technique was originally proposed for AoA (Angle of Arrival) or AoD (Angle of Departure) measurements using antenna arrays, but disclosed here to be used for DAoA (Difference in Angle of Arrival) measurements, requiring only a single omnidirectional antenna at the transmitter and at the receiver, provided that at the transmitted signal the RF phase is synchronized with the modulated message bits, and that accurate time stamping of detected messages is provided at the receiver.

Explanation on the present art CTE can be found in the open published Bluetooth Core Specification, Revision: v5.2, Revision Date: 2019 Dec. 31, section 2.1.5 Constant Tone Extension. FIG. 13 illustrates the CTE according to the present invention.

So according to the $3^{rd}$ embodiment of the invention, the Bluetooth advertising radio signals contain an unmodulated part, named CTE, and the RF phase of the signal is synchronized with the rising edge of at least one modulated bit of said signal, preferably the first preamble bit; and the mobile device is further configured to determine the time of arrival of said bit, and measure the RF phase of the signal at the CTE, and determine DAOA of signals transmitted from locations: A, B, and C, employing a single omnidirectional antenna at the beacon, and at the mobile device.

FIG. 13 illustrates the signal Constant Tone Extension according to a preferred embodiment of the invention, which according to the Bluetooth specifications, is an unmodulated (aka CW=Continuous Wave) part of the Bluetooth advertising signals. At the upper part of the picture, the BLE Link Layer advertising packet format is depicted, comprising: preamble, access address, PDU, CRC and Constant Tone Extension (CTE). Indicated above the packet block is that according to a preferred embodiment, at the rising edge of the first preamble bit, the RF (2.4 GHz) phase is set to zero. Further below the advertising packet block, three other blocks depict the sampling structure of the CTE, showing two sampling rates: 1 μs (second from bottom block) and 2 μs (lower block). In both cases, the Guard Period and Reference Period are 4 μs and 8 μs respectively.

Then, according to the $3^{rd}$ embodiment of the invention, upon detecting the beacon signals transmitted from locations: A, B, and C, the distances AB and BC are estimated at the mobile device by integrating the communicated acceleration magnitude, considering the estimated time of movement. Angle $\theta_2$ (in FIG. 6) can also be determined at the mobile device, based on the acceleration direction reported by the beacon from locations: A, B, and C.

In addition, angles $\theta_3$ and $\theta_6$ can be determined at the mobile device, by DAoA, employing Bluetooth IQ sampling on the CTE part of the Bluetooth advertising signals, and comparing accurate time stamping and phase measurements, associated with signals transmitted from locations: A, B and C.

Then, at the mobile device, a set of equations can be drafted and resolved, as presented in the detailed description part of this disclosure.

According to a $4^{th}$ embodiment of the present invention, the beacon is a Bluetooth tag, specifically transmitting Bluetooth advertising signals, comprising accelerometer but no magnetometer, so its acceleration measurements are reported in the beacon local coordinate system, which rotation angle relatively to the mobile coordinate system is unknown. Further, at the mobile device, DAOA measurements are employed for localization of the beacon, using a single omnidirectional antenna.

FIG. 7 illustrates a method for Localization of a moving beacon according to a $4^{th}$ embodiment of the present invention. In the background, two 2D cartesian coordinate systems are depicted: the beacon (tag) coordinate system ($X_T$-$Y_T$), drafted in thin lines, and the mobile coordinate system ($X_M$-$Y_M$), drafted in thicker lines. A beacon is depicted in locations: A, B, C, D, and E, and a mobile device is depicted in locations: $M_1$ and $M_2$.

Also, according to this embodiment, the beacon coordinate system ($X_T$-$Y_T$) is defined after the beacon locations A and B, such that the $X_T$ axis is aligned with AB, and the $Y_T$ axis perpendicularly crossing the $X_T$ axis, at the middle of AB, such that the mobile coordinate system ($X_M$-$Y_M$) is shifted by $My_1$ and $Mx_1$, and rotated clockwise by $\theta_1$, relatively to the beacon coordinate system ($X_T$-$Y_T$).

According to the $4^{th}$ embodiment of the invention, $\theta_1$ is unknown, since the beacon does not comprise a magnetometer, and the directions measured in the beacon coordinate system are not associated with the magnetic North.

According to the $4^{th}$ embodiment of the invention, the Bluetooth advertising radio signals contain an unmodulated part, named CTE, and the RF phase of the signal is synchronized with the rising edge of at least one modulated bit of said signal, preferably the first preamble bit; and the mobile device is further configured to determine the time of arrival of said bit, and measure the RF phase of the signal at the CTE, and determine DAoA of signals transmitted from locations: A, B, C, D, and E, employing a single omnidirectional antenna at the beacon, and at the mobile device.

Then, according to the $4^{th}$ embodiment of the invention, upon detecting the beacon signals communicating the beacon acceleration measured at locations: A, B, C, D and E, the distances AB, BC, CD and DE are estimated at the mobile device by integrating the communicated acceleration magnitude, considering the estimated time of movement. Also, angles $\theta_2$, $\theta_9$ and $\theta_{10}$ (in FIG. 7) can be determined at the mobile device, based on the acceleration direction reported by the beacon.

In addition, angles $\theta_3$, $\theta_6$ and $\theta_{11}$ can be measured at the mobile device, employing the Bluetooth IQ sampling technique, and comparing accurate time stamping and phase measurements, associated with signals transmitted from locations: A, B, C, D and E.

Also, $vector_{12}$, specifying the magnitude ($M_1M_2$) and direction ($\theta_{12}$) of the movement of the mobile device from $M_1$ to $M_2$, is determined at the mobile device, relatively to the mobile coordinate system, based on measurements made using an internal accelerometer and magnetometer, comprised in the mobile device according to this $4^{th}$ embodiment.

Then, at the mobile device, a set of equations can be drafted and resolved, as presented in the detailed description part of this disclosure.

According to a $5^{th}$ embodiment of the present invention, the beacon is a Bluetooth tag, specifically transmitting Bluetooth advertising signals, comprising accelerometer but no magnetometer, so its acceleration measurements are reported in the beacon local coordinate system, which rotation angle relatively to the mobile coordinate system is unknown. Further, at the mobile device, AOA measurements are employed for localization of the beacon, using an antenna array.

FIG. 8 illustrates a method for Localization of a moving beacon according to a $5^{th}$ embodiment of the present invention. In the background, two 2D cartesian coordinate systems are depicted: the beacon (tag) coordinate system ($X_T$-$Y_T$), drafted in thin lines, and the mobile coordinate system ($X_M$-$Y_M$), drafted in thicker lines. A beacon is depicted in locations: A, B, and C, and a mobile device is depicted in location: $M_1$.

Also, according to this embodiment, the beacon coordinate system ($X_T$-$Y_T$) is defined after the beacon locations A and B, such that the $X_T$ axis is aligned with AB, and the $Y_T$ axis perpendicularly crossing the $X_T$ axis, at the middle of AB, such that the mobile coordinate system ($X_M$-$Y_M$) is shifted by $My_1$ and $Mx_1$, and rotated clockwise, relatively to the beacon coordinate system ($X_T$-$Y_T$).

According to the $5^{th}$ embodiment of the invention, the angle of rotation between the two coordinate system: ($X_T$-$Y_T$) and ($X_M$-$Y_M$), is unknown.

According to the $5^{th}$ embodiment of the invention, the Bluetooth advertising radio signals contain an unmodulated part, named CTE, and the RF phase of the signal is synchronized with the rising edge of at least one modulated bit of said signal, preferably the first preamble bit; and the mobile device is further configured to determine the time of arrival of said bit, and measure the RF phase of the signal at the CTE, and determine AoA of signal transmitted from locations: A, B, and C, employing a single omnidirectional antenna at the beacon, and an antenna array, preferably comprising two antenna elements, at the mobile device.

According to the $5^{th}$ embodiment of the invention, upon detecting the beacon signals transmitted from three locations: A, B, and C, the distances AB and BC are estimated at the mobile device based on the reported beacon acceleration, considering the estimated time of movement. Angle $\theta_2$ (in FIG. 8) can also be determined at the mobile device, based on the acceleration direction reported by the beacon from locations: A, B, and C.

In addition, angles $\theta_3$ and $\theta_6$ can be determined at the mobile device, comparing AoA of signals transmitted from locations: A, B and C.

Then, at the mobile device, a set of equations can be drafted and resolved, as presented in the detailed description part of this disclosure.

Preferably, the disclosed method further comprises the steps of, at the mobile device:

a. acquiring self-position relatively to a global coordinate system;
b. determining the beacon position relatively to said global coordinate system;
c. communicating the beacon global position to another mobile device or to a remote server.

As known in the art, this latter function enables tracking a low power transmitting beacon over very large areas, far beyond the direct communication range between the beacon and a nearby mobile device, practically worldwide, typically using the Internet over cellular networks.

The present invention also discloses a radio beacon trackable by a mobile device, said beacon comprising: an accelerometer, a transmitter and a controller; said beacon configured to measure a momentary acceleration relatively to a locally defined coordinate system, and periodically broadcast signals communicating said measured acceleration; and configured to enable the mobile device to measure at least one of: the Difference in Time of Arrival (DToA) or Difference in Angle of Arrival (DAoA) between these signals, or Time of Arrival (ToA) or Angle of Arrival (AoA) of these signals; and enable the mobile device to determine the distance and direction to the beacon, based on said acceleration measurement, and on said measured at least one of: DToA or DAoA or ToA or AoA.

Preferably, the disclosed beacon further comprises a magnetometer, and the direction is measured at the beacon relatively to the earth magnetic North.

Preferably, the disclosed beacon is Bluetooth complaint, configured to broadcast Bluetooth advertising signals, at a Difference in Time of Emission (DToE) selectable from a set of discrete values. Furthermore, said DToE is configured to change from time to time in a pseudorandom pattern.

According to a $1^{st}$ embodiment and a $2^{nd}$ embodiment, the disclosed beacon is Bluetooth complaint, configured to broadcast periodic Bluetooth advertising signals, at a Difference in Time of Emission (DToE) set to [1 s+m*0.625 ms], wherein m is an integer number with range 0-16, changed from one Bluetooth event to another, in a pseudorandom pattern, as illustrated in FIG. 12.

According to a $3^{rd}$ embodiment and to a $4^{th}$ embodiment and to a $5^{th}$ embodiment, the disclosed beacon is Bluetooth complaint, configured to broadcast periodic Bluetooth advertising signals, comprising an unmodulated part, named CTE, and the signal RF phase is synchronized with the signal rising edge of at least one modulated bit, preferably the first preamble bit as illustrated in FIG. 13; enabling the mobile device to determine the time of arrival of this bit, and measure the RF phase of the signal at the unmodulated part.

FIG. 10 illustrates a Block Diagram of a radio beacon according to preferred embodiment of the present invention. The main block, indicating inside "Bluetooth system on chip (SOC)", comprises two solid-line blocks, one marked "Controller" and the other marked "Transmitter", the latter shown coupled to an antenna. Outside the SOC, three additional blocks are depicted, all coupled to the controller: "accelerometer", "geo magnetic sensor" (aka magnetometer), and "barometer". Practically, the Bluetooth SOC comprises both transmitter and receiver.

According to a $1^{st}$ embodiment and a $3^{rd}$ embodiment, the disclosed beacon comprises an accelerometer and a magnetometer.

According to a $2^{nd}$ embodiment and a $4^{th}$ embodiment and a $5^{th}$ embodiment, the disclosed beacon comprises an accelerometer but does not comprise a magnetometer.

The present invention further discloses a mobile device for tracking a radio beacon, said device comprising: a receiver, an accelerometer, and a controller; said device configured to detect signals transmitted by the beacon indicating the momentary acceleration of the beacon relatively to the beacon local coordinate system; and to measure at least one of: the Difference in Time of Arrival (DToA) or Difference in Angle of Arrival (DAoA) between these signals, or Time of Arrival (ToA) or Angle of Arrival (AoA) of these signals; and determine the distance and direction to the beacon, based on the communicated acceleration measurement, and the measured: DToA or DAoA or ToA or AoA.

Preferably, the disclosed mobile device is further configured to measure the distance and direction of its own movement, and use these measurements in at least one of: determining the distance and direction to the beacon, or determining the movement direction of the beacon in the mobile coordinate system.

Preferably, the disclosed mobile device further comprises a magnetometer, and configured to measure the direction relatively to the magnetic North.

Possibly, the disclosed mobile device could further comprise an antenna array, with at least two antenna elements, coupled to said receiver, and configured to determine the direction to the beacon, in the mobile coordinate system, by measurement of AoA.

Preferably, the disclosed mobile device is configured to scan for Bluetooth advertising signals.

Preferably, the disclosed mobile device further comprises a GNSS receiver, and comprises or coupled to long range communication means; and configured to report the position of the beacon by said communication means, relatively to a global coordination system.

FIG. 11 illustrates a Block Diagram of a mobile tracking device according to a preferred embodiment of the present invention. The main block, indicating inside "mobile smartphone", comprises a block, named "controller", to which all other blocks are coupled: "display", "keyboard", "magnetometer", "barometer", "accelerometer", "short range transceiver" (+ antenna), "long range transceiver" (+ antenna), and "GNSS receiver" (+ antenna).

Preferably, the "short range transceiver" is Bluetooth compliant, and the "long range transceiver" is 4G/5G/6G cellular.

According to a $2^{nd}$ embodiment and a $4^{th}$ embodiment of the present invention, the disclosed mobile device comprises an accelerometer and a magnetometer, and configured to measure the distance and direction of its own movement, and use these measurements in determining the distance and direction to the beacon, and determining the movement direction of the beacon in the mobile coordinate system.

According to a $5^{th}$ embodiment of the present invention, the disclosed mobile device comprises an antenna array with two antenna elements, coupled to the receiver, and configured to determine the direction to the beacon, by AoA measurements.

Finally, FIG. 9 illustrates a Display at a mobile device tracking a beacon according to a preferred embodiment of the present invention. A hand-held mobile device is illustrated, on which a dotted curved line is displayed, starting by a person icon, and pointing to a beacon icon. Asides the dotted line, appears a text indicating the distance and elevation to the beacon.

In many cases, the place of implementation described herein is merely a designer's preference and not a hard requirement. For example, functions disclosed as implemented at the tracking device may alternatively be partially implemented at access points. Given the rapidly declining cost of digital signal processing and other processing functions, it is easily possible, for example, to transfer the processing or a particular function from one of the functional elements described herein to another functional element, or to the so-called cloud, as often done in Internet of Things (IoT) systems, without changing the inventive operation of the system.

Other objects and advantages of the invention will become apparent as the description proceeds.

BRIEF DESCRIPTION OF THE DRAWINGS

The above and other characteristics and advantages of the invention will be better understood through the following illustrative and non-limitative detailed description of preferred embodiments thereof, with reference to the appended drawings, wherein:

FIG. 1 illustrates a prior art Angle of Arrival (AoA) Method to geolocate a radio beacon. The beacon (Transmitter) is shown at the bottom of the figure, coupled to an assumedly omnidirectional antenna. Above the transmitter, two receivers are shown (or single receiver moving between two locations), side by side, each coupled to an antenna array, enabling determining the angle of arrival of the signal arriving from the beacon, typically by comparing the different RF phase measured through each individual antenna. Measuring the AoA at two different locations, while the beacon is static, enables determining the beacon position, in 2D, relatively to the receiver(s).

FIG. 2 depicts LOP (Line of Position) of static radio beacon based on DTOA according to US patent application 17,972,716. On the X-axis of a 2D Cartesian coordinate system, a mobile device is depicted at two different locations: a first location A ($x_1$, $y_1$) and a second location B ($x_2$, $y_2$). Somewhere above the X-axis, a beacon is depicted at a location with coordinates (x, y), on the left hyperbola branch, marked in a thicker line, wherein the hyperbola formula is indicated below. In this formula, $DTOA_{12}$ is the difference in time of arrival of two signals transmitted by the beacon, at a difference in time of emission of $DTOE_{12}$, assuming that a first of these signals arrives at the mobile device while visiting the first location, and a second of these signals arrives at the mobile device while visiting the second location. The distance between said first location and said second location is marked as AB, and it actually defines the coordinate system X-Y, such that X-axis is aligned with AB, and the Y-axis is perpendicular to AB, with A and B equally apart from the Y-axis.

FIG. 3 illustrates LOP (Line of Position) of static mobile device based on DTOA measurements of moving beacon signals. On the X-axis of a 2D Cartesian coordinate system, a radio beacon is depicted at two different locations: a first location A ($x_1$, $y_1$) and a second location B ($x_2$, $y_2$). Somewhere above the X-axis, a mobile device is depicted at a location with coordinates (x, y), on the left hyperbola branch, marked in a thicker line, wherein the hyperbola formula is indicated below. In this formula, $DTOA_{12}$ is the difference in time of arrival of two signals transmitted by the beacon, at a difference in time of emission of $DTOE_{12}$, assuming that a first of these signals arrives at the mobile device while the beacon is at the first location, and a second of these signals arrives at the mobile device while the beacon is at the second location. The distance between first location and second location is marked as AB, and it actually defines the coordinate system X-Y, such that X-axis is aligned with AB, and the Y-axis is perpendicular to AB, with A and B equally apart from the Y-axis.

FIG. 4 illustrates a method for Localization of a moving beacon according to a 1st embodiment of the present invention. In the background, two 2D cartesian coordinate systems are depicted: the beacon (tag) coordinate system ($X_T$-$Y_T$), drafted in thin lines, and the mobile coordinate system ($X_M$-$Y_M$), drafted in thicker lines.

A beacon is depicted in locations: A, B and C, and a mobile device is depicted in location $M_1$, wherein the $X_T$-$Y_T$ coordinates thereof are:

$$M_1\,(Mx_1,\,My_1),$$

$$A\,(AB/2,\,0),$$

$$B\,(-AB/2,\,0),$$

$$C\,(-AB/2-BC*\cos\Theta_2,\,BC*\sin\Theta_2),$$

wherein $\Theta_2$ is the angle between BC and AB.

Actually, the beacon coordinate system ($X_T$-$Y_T$) is defined after the beacon locations A and B, such that the $X_T$ axis is aligned with AB, and the $Y_T$ axis perpendicularly crossing the $X_T$ axis, i.e. the origin, at the middle of AB.

So, the Mobile coordinate system ($X_M$-$Y_M$) is shifted by $My_1$ and $Mx_1$, and rotated clockwise by $\theta_1$, relatively to the beacon coordinate system ($X_T$-$Y_T$).

According to this embodiment, $Y_M$ is directed to the magnetic North, therefore the $Y_M$ axis is marked with (N). Also, according to this embodiment, the angle between $Y_M$ and $Y_T$, marked by $\theta_1$, is known, which practically means that the beacon comprises a magnetometer, and reports its acceleration direction relatively to the magnetic North.

Also depicted in this figure are two hyperbolic Lines of Position: $LOP_{AB}$ and $LOP_{BC}$, associated with DTOA measurements, correspondingly considering AB and BC as the hyperbola baseline.

FIG. 5 illustrates a method for Localization of a moving beacon according to a 2nd embodiment of the present invention. In the background, two 2D cartesian coordinate systems are depicted: the beacon (tag) coordinate system ($X_T$-$Y_T$), drafted in thin lines, and the mobile coordinate system ($X_M$-$Y_M$), drafted in thicker lines.

A beacon is depicted in locations: A, B, C, D, and E, and a mobile device is depicted in locations: $M_1$, and $M_2$, wherein the $X_T$-$Y_T$ coordinates thereof are:

$$M_1\,(Mx_1,\,My_1),$$

$$M_2\,(Mx_2,\,My_2),$$

$$A\,(AB/2,\,0),$$

$$B\,(-AB/2,\,0),$$

$$C(-AB/2-BC*\cos\Theta_2,\,BC*\sin\Theta_2),$$

$$D\,(-AB/2-BC*\cos\Theta_2-CD*\cos\Theta_3,\,BC*\sin\Theta_2+CD*\sin\Theta_3)$$

$$E\,(-AB/2-BC*\cos\Theta_2-CD*\cos\Theta_3-DE*\cos\Theta_4,\;BC*\sin\Theta_2+CD*\sin\Theta_3+DE*\sin\Theta_4)$$

and:

$\Theta_2$ is the angle between BC and $X_T$, $\Theta_3$ is the angle between CD and $X_T$, $\Theta_4$ is the angle between DE and $X_T$, $\Theta_{12}$ is the angle between the line connecting $M_1$ and $M_2$, and the $X_M$ axis.

Also, according to this embodiment, the beacon coordinate system ($X_T$-$Y_T$) is defined after the beacon locations A and B, such that the $X_T$ axis is aligned with AB, and the $Y_T$ axis perpendicularly crossing the $X_T$ axis, at the middle of AB, such that the mobile coordinate system ($X_M$-$Y_M$) is shifted by $My_1$ and $Mx_1$, and rotated clockwise by $\theta_1$, relatively to the beacon coordinate system ($X_T$-$Y_T$). However, according to the 2nd embodiment, $\theta_1$ is preliminarily unknown.

The movement of the mobile device from $M_1$ to $M_2$ is depicted by a dotted line with arrow pointing to $M_2$, marked as $vector_{12}$, implying that it indicates a magnitude and a direction.

FIG. 6 illustrates a method for Localization of a moving beacon according to a 3rd embodiment of the present invention. In the background, two 2D cartesian coordinate systems are depicted: the beacon (tag) coordinate system ($X_T$-$Y_T$), drafted in thin lines, and the mobile coordinate system ($X_M$-$Y_M$), drafted in thicker lines.

A beacon is depicted in locations: A, B, and C, and a mobile device is depicted in location: $M_1$, wherein the $X_T$-$Y_T$ coordinates thereof are:

$$M_1\,(Mx_1,\,My_1),$$

$$A\,(AB/2,\,0),$$

$$B\,(-AB/2,\,0),$$

$$C\,(-AB/2 - BC*\cos\Theta_2,\,BC*\sin\Theta_2),$$

and:

$\theta_2$ is the angle between BC and AB, $\theta_3$, $\theta_4$ and $\theta_5$ are angles in triangle $ABM_1$, $\theta_6$, $\theta_7$ and $\theta_8$ are angles in triangle $BCM_1$.

Also, according to this embodiment, the beacon coordinate system ($X_T$-$Y_T$) is defined after the beacon locations A and B, such that the $X_T$ axis is aligned with AB, and the $Y_T$ axis perpendicularly crossing the $X_T$ axis, at the middle of AB, such that the mobile coordinate system ($X_M$-$Y_M$) is shifted by $My_1$ and $Mx_1$, and rotated clockwise by $\theta_1$, relatively to the beacon coordinate system ($X_T$-$Y_T$).

According to the 3rd embodiment of the invention, $\theta_1$ is known, since the beacon comprises a magnetometer such that the directions measured in the beacon coordinate system are associated with the magnetic North, and since the mobile device also comprises a magnetometer, so also the directions measured in the mobile coordinate system are associated with the magnetic North.

FIG. 7 illustrates a method for Localization of a moving beacon according to a 4th embodiment of the present invention. In the background, two 2D cartesian coordinate systems are depicted: the beacon (tag) coordinate system ($X_T$-$Y_T$), drafted in thin lines, and the mobile coordinate system ($X_M$-$Y_M$), drafted in thicker lines.

A beacon is depicted in locations: A, B, C, D, and E, and a mobile device is depicted in locations: $M_1$ and $M_2$, wherein the $X_T$-$Y_T$ coordinates thereof are:

$$M_1\,(Mx_1,\,My_1),$$

$$M_2\,(Mx_2,\,My_2),$$

$$A\,(AB/2,\,0),$$

$$B\,(-AB/2,\,0),$$

$$C(-AB/2 - BC*\cos\Theta_2,\,BC*\sin\Theta_2),$$

$$D\,(-AB/2 - BC*\cos\Theta_2 - CD*\cos\Theta_3,\,BC*\sin\Theta_2 + CD*\sin\Theta_3)$$

$$E\,(-AB/2 - BC*\cos\Theta_2 - CD*\cos\Theta_3 - DE*\cos\Theta_4,\\ BC*\sin\Theta_2 + CD*\sin\Theta_3 + DE*\sin\Theta_4)$$

and:

$\Theta_2$ is the angle between BC and $X_T$, $\Theta_9$ is the angle between CD and $X_T$, $\Theta_{10}$ is the angle between DE and $X_T$, $\Theta_{12}$ is the angle between the line connecting $M_1$ and $M_2$, and the $X_M$ axis.

$\Theta_2$ is the angle between BC and AB, $\Theta_3$, $\Theta_4$ and $\Theta_5$ are angles in triangle $ABM_1$, $\Theta_6$, $\Theta_7$ and $\Theta_8$ are angles in triangle $BCM_1$, $\Theta_{11}$ is the angle in triangle $DEM_2$ headed at $M_2$.

The movement of the mobile device from $M_1$ to $M_2$ is depicted by a dotted line with arrow pointing to $M_2$, marked as $vector_{12}$, implying that it indicates a magnitude and a direction.

Also, according to this embodiment, the beacon coordinate system ($X_T$-$Y_T$) is defined after the beacon locations A and B, such that the $X_T$ axis is aligned with AB, and the $Y_T$ axis perpendicularly crossing the $X_T$ axis, at the middle of AB, such that the mobile coordinate system ($X_M$-$Y_M$) is shifted by $My_1$ and $Mx_1$, and rotated clockwise by $\theta_1$, relatively to the beacon coordinate system ($X_T$-$Y_T$).

According to the 4th embodiment of the invention, $\theta_1$ is unknown, since the beacon does not comprise a magnetometer, and the directions measured in the beacon coordinate system are not associated with the magnetic North.

FIG. 8 illustrates a method for Localization of a moving beacon according to a 5th embodiment of the present invention. In the background, two 2D cartesian coordinate systems are depicted: the beacon (tag) coordinate system ($X_T$-$Y_T$), drafted in thin lines, and the mobile coordinate system ($X_M$-$Y_M$), drafted in thicker lines.

A beacon is depicted in locations: A, B, and C, and a mobile device is depicted in location: $M_1$, wherein the $X_T$-$Y_T$ coordinates thereof are:

$$M_1\,(Mx_1,\,My_1),$$

$$A\,(AB/2,\,0),$$

$$B\,(-AB/2,\,0),$$

$$C\,(-AB/2 - BC*\cos\Theta_2,\,BC*\sin\Theta_2),$$

and:

$\Theta_2$ is the angle between BC and $X_T$, $\Theta_3$, $\Theta_4$ and $\Theta_5$ are angles in triangle $ABM_1$, $\Theta_6$, $\Theta_7$ and $\Theta_8$ are angles in triangle $BCM_1$.

Also, according to this embodiment, the beacon coordinate system ($X_T$-$Y_T$) is defined after the beacon locations A and B, such that the $X_T$ axis is aligned with AB, and the $Y_T$ axis perpendicularly crossing the $X_T$ axis, at the middle of AB, such that the mobile coordinate system ($X_M$-$Y_M$) is shifted by $My_1$ and $Mx_1$, and rotated clockwise, relatively to the beacon coordinate system ($X_T$-$Y_T$).

According to the 5th embodiment of the invention, the angle of rotation between the two coordinate system: ($X_T$-$Y_T$) and ($X_M$-$Y_M$), is unknown.

Furthermore, according to this embodiment, the beacon does not comprise a magnetometer, however the mobile device comprises a magnetometer, and an antenna array, enabling measuring AoA, i.e, the direction from the mobile device to the beacon, relatively to the magnetic North.

FIG. 9 illustrates a Display at a mobile device tracking a beacon according to a preferred embodiment of the present invention. A hand-held mobile device is illustrated, on which a dotted curved line is displayed, starting by a person icon, and pointing to a beacon icon. Asides the dotted line, appears a text indicating the distance and elevation to the beacon.

FIG. 10 illustrates a Block Diagram of a radio beacon according to preferred embodiment of the present invention. The main block, indicating inside "Bluetooth system on chip (SOC)", comprises two solid-line blocks, one marked "Controller" and the other marked "Transmitter", the latter shown coupled to an antenna. Outside the SOC, three additional blocks are depicted, all coupled to the controller: "accelerometer", "geo magnetic sensor" (aka magnetometer), and "barometer". Practically, the Bluetooth SOC comprises both transmitter and receiver.

FIG. 11 illustrates a Block Diagram of a mobile tracking device according to a preferred embodiment of the present invention. The main block, indicating inside "mobile phone", comprises a main block, named "controller", to which all other blocks are coupled: "display", "keyboard", "magnetometer", "barometer", "accelerometer", "short range transceiver" (+ antenna), "long range transceiver" (+ antenna), and "GNSS receiver" (+ antenna).

Preferably, the "short range transceiver" is Bluetooth compliant, and the "long range transceiver" is 4G/5G/6G cellular.

FIG. 12 illustrates the beacon transmitted signals according to a preferred embodiment of the present invention, compliant with the standard Bluetooth advertising specifications. At the upper side of the picture, three groups of three signals each are depicted by vertical grey colored rectangles marked by 37, 38, and 39. Each group of three signals defines an advertising event according to the Bluetooth standard, wherein the time difference between two consecutive advertising events is indicated as [advinterval+advDelay], and further down marked $DTOE_{12}$, and then $DTOE_{23}$, considering specific signals. At the bottom of the picture, three bullets specify:

the frequency of transmission associated with each of the channels 37, 38 and 39;

advinterval timing restrictions;

advDelay timing restrictions.

Preferably, advinterval is set to 1 sec, and AdvDelay is set to m*0.625 ms, wherein m is an integer number with range 0-16, changed from one Bluetooth event to another, in a pseudorandom pattern.

FIG. 13 illustrates the signal Constant Tone Extension according to a preferred embodiment of the invention, which according to the Bluetooth specifications, is an unmodulated (aka CW=Continuous Wave) part of the Bluetooth advertising signals. At the upper part of the picture, the BLE Link Layer advertising packet format is depicted, comprising: preamble, access address, PDU, CRC and Constant Tone Extension (CTE). Indicated above the packet block is that according to a preferred embodiment, at the rising edge of the first preamble bit, the RF (2.4 GHz) phase is set to zero. Further below the advertising packet block, three other blocks depict the sampling structure of the CTE, showing two sampling rates: 1 μs (second from bottom block) and 2 μs (lower block). In both cases, the Guard Period and Reference Period are 4 μs and 8 μs respectively.

DETAILED DESCRIPTION

The above examples and description have of course been provided only for the purpose of illustration, and are not intended to limit the invention in any way. As will be appreciated by the skilled person, the invention can be carried out in a great variety of ways, employing more than one technique from those described in this document, all without exceeding the scope of the invention.

The present invention discloses a method for tracking a radio beacon, by a mobile device, comprising the steps of:

a. at the radio beacon, defining the beacon coordinate system;

b. at the radio beacon, at each different location: location (A), location (B), and location (C), measuring a momentary acceleration relatively to the beacon coordinate system, and broadcasting a radio signal indicating said acceleration measurement;

c. at the mobile device, defining the mobile coordinate system;

d. at the mobile device, at location (M1), detecting the signals transmitted by the beacon from: location (A), location (B) and location (C), including the beacon acceleration measurement; and measuring at least one of: the Difference in Time of Arrival (DToA) or Difference in Angle of Arrival (DAoA) between these signals, or Time of Arrival (ToA) or Angle of Arrival (AoA) of these signals;

e. at the mobile device, transforming the acceleration measurement, from the beacon coordinate system to the mobile coordinate system;

f. at the mobile device, at location (M1), determining the distance and direction to the beacon, based on said beacon acceleration measurement, and on said measured at least one of: DToA or DAoA or ToA or AoA.

Preferably, the radio signals broadcast by the beacon are Bluetooth advertising signals, as typically employed nowadays in tags attached to keyholders, suitcases, cars and people, trackable by personal smartphones. This should not limit the embodiment of the present invention, whatsoever, though this scenario seems practical and convenient for the purpose of describing the invention.

Possibly, the radio beacon coordinate system and the mobile device coordinate system are aligned, or the direction at the beacon or the mobile device, is measured relatively to the earth magnetic North.

According to a 1st embodiment of the present invention, the beacon is a Bluetooth tag, specifically transmitting Bluetooth advertising signals, comprising accelerometer and magnetometer, such that its acceleration measurements are reported in the beacon local coordinate system, which rotation angle relatively to the mobile coordinate system is known. Further, at the mobile device, DTOA measurements are employed for localization of the beacon.

FIG. 4 illustrates a method for Localization of a moving beacon according to a 1st embodiment of the present invention. In the background, two 2D cartesian coordinate systems are depicted: the beacon (tag) coordinate system ($X_T$-$Y_T$), its axes drafted in thin lines, and the mobile coordinate system ($X_M$-$Y_M$), its axes drafted in thicker lines. A beacon is depicted in locations: A, B and C, and a mobile device is depicted in location $M_1$, wherein the $X_T$-$Y_T$ coordinates thereof are indicated:

$$M_1\,(Mx_1,\,My_1),$$

$$A\,(AB/2,\,0),$$

$$B\,(-AB/2,\,0),$$

$$C\,(-AB/2-BC*\cos\Theta_2,\,BC*\sin\Theta_2),$$

wherein 02 is the angle between BC and AB.

Actually, the beacon coordinate system ($X_T$-$Y_T$) is defined after the beacon locations A and B, such that the $X_T$ axis is aligned with AB, and the $Y_T$ axis perpendicularly crossing the $X_T$ axis, at mid AB. Such that, the Mobile coordinate system ($X_M$-$Y_M$) is shifted by $My_1$ and $Mx_1$, and rotated clockwise by $\theta_1$, relatively to the beacon coordinate system ($X_T$-$Y_T$).

According to this 1[4] embodiment, $Y_M$ is directed to the magnetic North, therefore the $Y_M$ axis is marked in FIG. 4 with (N). Also, according to this 1st embodiment, the angle between $Y_M$ and $Y_T$, [$\theta_1$], is known, which practically means that the beacon comprises a magnetometer, and reports its acceleration direction relatively to the magnetic North.

So, according to the 1st embodiment of the invention, the radio beacon coordinate system and the mobile device coordinate system are aligned (meaning that the two refer to a same reference direction, or that $\theta_1$ is known). Furthermore, at least one of (both, according to the 1st embodiment): the beacon coordinate system or the mobile coordinate system is aligned with the earth magnetic North.

Also depicted in this figure are two hyperbolic Lines of Position: $LOP_{AB}$ and $LOP_{BC}$, associated with DTOA measurements, correspondingly considering AB and BC as the hyperbola baseline. The equations that define these LOPs are drafted at the bottom of FIG. 3.

In other words, and still with respect to the 1st embodiment and FIG. 4, angle $\theta_1$ between axes $Y_M$ and $Y_T$ is known at the mobile device, and consequently the acceleration direction reported by the beacon according to the beacon coordinate system, could be easily converted to a direction in the mobile coordinate system.

Preferably, the beacon radio signals are broadcast at a Difference in Time of Emission (DToE) selectable from a set of discrete values known or communicated to the mobile device, and furthermore, said DToE is changed from time to time in a pseudorandom pattern.

Specifically, according to the 1st embodiment of the invention, and with respect to FIG. 12, the beacon transmits Bluetooth advertising signals, so DTOE is set to n*0.625 ms, wherein n is an integer number with range 32-16,777,215. More detailed, FIG. 12 illustrates the beacon signals according to a 1st embodiment of the present invention, compliant with the Bluetooth advertising specifications. At the upper side of the picture, three groups of three signals each are depicted by vertical grey colored rectangles marked by 37, 38, and 39. Each group of three signals defines an advertising event according to the Bluetooth standard, wherein the time difference between two consecutive advertising events is indicated as [advinterval+advDelay], and further down marked $DTOE_{12}$, and then $DTOE_{23}$, considering the specific signals. At the bottom of the picture, three bullets specify:

- the frequency of transmission associated with each of the channels 37, 38 and 39;
- advinterval timing restrictions;
- advDelay timing restrictions.

As indicated in this picture, advinterval is an integer multiple of 0.625 ms in the range 20-10,485,759.375 ms, and AdvDelay is a pseudo-random value with range 0-10 ms. Then, according to the 1st embodiment of the invention, advinterval is set to 1 sec, and AdvDelay is set to m*0.625 ms, wherein m is an integer number with range 0-16, changed from one Bluetooth event to another, in a pseudo-random pattern. Consequently, DTOE is configured to [1000+m*0.625] ms, wherein m is an integer number changed pseudo randomly each transmission.

Still according to the 1st embodiment of the invention, upon detecting the beacon signals transmitted from three locations: A, B, and C, the distances AB and BC are estimated at the mobile device by integrating the communicated acceleration magnitude, considering the estimated time of movement. Angle $\theta_2$ (in FIG. 4) can also be determined at the mobile device, as the difference between the acceleration direction reported in the signal transmitted from A, and the acceleration direction reported in the signal transmitted from B, even in the beacon coordinate system.

Then, upon measuring $DTOA_{AB}$ and $DTOA_B C$ at the mobile device, a set of equations can be drafted and resolved, comprising, with respect to FIG. 4:

Knowns $\theta_1$, $\theta_2$, AB, BC, ($DTOA_{AB}$-$DTOE_{AB}$), ($DTOA_{BC}$-$DTOE_{BC}$)

Unknowns $Mx_1$, $My_1$

Equations $$[(Mx_1 - AB/2)^2 + (My_1)^2]^{0.5} - [(Mx_1 + AB/2)^2 + (My_1)^2]^{0.5} = C*(TDOA_{AB} - TDOE_{AB}) \quad (1)$$

$$[(Mx_1 + AB/2)^2 + (My_1)^2]^{0.5} - [(Mx_1 + AB/2 + BC*\cos\Theta_2)^2 + (My_1 - BC*\sin\Theta_2)^2]^{0.5} = C*(TDOA_{BC} - TDOE_{BC}) \quad (2)$$

A person skilled in the art probably appreciates that equations (1) and (2) above are associated with hyperbolas, with baselines AB and BC, respectably, as is also illustrated in FIG. 3.

Apparently, in the above equations, since DTOE=[1000+m*0.625] ms, wherein m is an integer number unknown to the mobile device, DTOE is not defined unequivocally, so the resolution seems ambiguous; however, since at the speed of light RF signals travel 187.5 Km in 0.625 ms, this ambiguity can be easily removed, considering shorter distances between the beacon and the mobile device.

Once the mobile position in the beacon coordinate system [$Mx_1$, $My_1$] is resolved, and knowing the rotation angle $\theta_1$ between the beacon and the mobile coordinate systems, the mobile can easily determine the distance and direction to the beacon in its own coordinate system.

The disclosed method may further comprise the steps of:

a. at the radio beacon, at each different location: location (D), and location (E), measuring a momentary acceleration relatively to the beacon coordinate system, and broadcasting a radio signal indicating said acceleration measurement;
b. at the mobile device, moving from location (M1) to location (M2), and measuring the distance and direction therebetween relatively to the mobile coordinate system;
c. at the mobile device, at location (M2), detecting the signals transmitted by the beacon from: location (D) and location (E), including the beacon acceleration measurement, and measuring at least one of: the Difference in Time of Arrival (DToA) or Difference in Angle of Arrival (DAoA) between these signals, or Time of Arrival (ToA) or Angle of Arrival (AoA) of these signals;
d. at the mobile device, at location (M2), determining the distance and direction to the beacon, based on the beacon acceleration, and on the measured at least one of: DToA or DAoA or ToA or AoA.

According to a 2nd embodiment of the present invention, the beacon is a Bluetooth tag, specifically transmitting Bluetooth advertising signals, comprising accelerometer but no magnetometer, so its acceleration measurements are reported in the beacon local coordinate system, and the rotation angle between beacon and mobile coordinate systems is preliminarily unknown. Further, at the mobile device, DTOA measurements are employed for localization of the beacon.

FIG. 5 illustrates a method for Localization of a moving beacon according to a 2nd embodiment of the present invention. In the background, two 2D cartesian coordinate systems are depicted: the beacon (tag) coordinate system ($X_T$-$Y_T$), drafted in thin lines, and the mobile coordinate system ($X_M$-$Y_M$), drafted in thicker lines. A beacon is depicted in locations: A, B, C, D, and E, and a mobile device is depicted in locations: $M_1$, and $M_2$, wherein the $X_T$-$Y_T$ coordinates thereof are:

$$M_1\,(Mx_1,\,My_1),$$

$$M_2\,(Mx_2,\,My_2),$$

$$A\,(AB/2,\,0),$$

$$B\,(-AB/2,\,0),$$

$$C\,(-AB/2-BC*\cos\Theta_2,\,BC*\sin\Theta_2),$$

$$D\,(-AB/2-BC*\cos\Theta_2-CD*\cos\Theta_3,\,BC*\sin\Theta_2+CD*\sin\Theta_3)$$

$$E\,(-AB/2-BC*\cos\Theta_2-CD*\cos\Theta_3-DE*\cos\Theta_4,\; BC*\sin\Theta_2+CD*\sin\Theta_3+DE*\sin\Theta_4)$$

and:

$\Theta_2$ is the angle between BC and $X_T$, $\Theta_3$ is the angle between CD and $X_T$, $\Theta_4$ is the angle between DE and $X_T$, $\Theta_{12}$ is the angle between the line connecting $M_1$ and $M_2$, and the $X_M$ axis.

Also, according to this embodiment, the beacon coordinate system ($X_T$-$Y_T$) is defined after the beacon locations A and B, such that the $X_T$ axis is aligned with AB, and the $Y_T$ axis perpendicularly crossing the $X_T$ axis, at the middle of AB, such that the mobile coordinate system ($X_M$-$Y_M$) is shifted by $My_1$ and $Mx_1$, and rotated clockwise by $\theta_1$, relatively to the beacon coordinate system ($X_T$-$Y_T$). However, according to the 2nd embodiment, $\theta_1$ is preliminarily unknown.

The movement of the mobile device from $M_1$ to $M_2$ is depicted by a dotted line with arrow pointing on $M_2$, marked as $vector_{12}$, implying that it indicates a magnitude and a direction.

According to a 2nd embodiment of the present invention, the beacon transmits Bluetooth advertising signals, DTOE configured to n*0.625 ms, n being an integer number with range 32-16,777,215, as illustrated in FIG. 12, and further configuring DTOE=[advinterval+advDelay], wherein AdvDelay=m*0.625 ms, m being an integer number with range 0-16, selected pseudo randomly.

According to the 2nd embodiment of the invention, upon detecting the beacon signals transmitted from five locations: A, B, C, D, and E, the distances AB, BC, CD, and DE are estimated at the mobile device by integrating the communicated acceleration magnitude, considering the estimated time of movement. Then, angles $\theta_2$, $\theta_3$, and $\theta_4$ (in FIG. 5) can also be determined at the mobile device, based on the acceleration direction reported by the beacon, relatively to the beacon coordinate system, in signals transmitted from locations: A, B, C, D, and E.

In addition, $vector_{12}$, specifying the magnitude ($M_1M_2$) and direction ($\theta_{12}$) of the movement of the mobile device from $M_1$ to $M_2$, can be determined at the mobile device, relatively to the mobile coordinate system, based on measurements made using an internal accelerometer and magnetometer, comprised in the mobile device according to this 2nd embodiment.

Then, upon measuring $DTOA_{AB}$, $DTOA_{BC}$, and $DTOA_{DE}$, at the mobile device, and assessing $DTOE_{AB}$, $DTOE_{BC}$, and $DTOE_{DE}$, considering that DTOE is an integer multiplication of 0.625 ms, and that the range between beacon and mobile is less than 0.625 ms*C=187.5 Kms (if this range is larger, there are other ways to remove the ambiguity, known in the art) a set of equations can be drafted and resolved, comprising, with respect to FIG. 5:

Knowns $\theta_2$, $\theta_3$, $\theta_4$, $\theta_{12}$, AB, BC, CD, DE, ($DTOA_{AB}$-$DTOE_{AB}$), ($DTOA_{BC}$-$DTOE_{BC}$), ($DTOA_{DE}$-$DTOE_{DE}$), $vector_{12}$ (magnitude and magnetic direction)

Unknowns $\theta_1$, $Mx_1$, $My_1$, $Mx_2$, $My_2$

Equations $$\left[(Mx_1-AB/2)^2+(My_1)^2\right]^{0.5}-\left[(Mx_1+AB/2)^2+(My_1)^2\right]^{0.5}=C*(DTOA_{AB}-DTOE_{AB}) \quad (1)$$

$$\left[(Mx_1+AB/2)^2+(My_1)^2\right]^{0.5}-\left[(Mx_1+AB/2+BC*\cos\Theta_2)^2+(My_1-BC*\sin\Theta_2)^2\right]^{0.5}=C*(DTOA_{BC}-DTOE_{BC}) \quad (2)$$

$$\left[(Mx_2+AB/2+BC*\cos\Theta_2+CD*\cos\Theta_3)^2+(My_2-BC*\sin\Theta_2-CD*\sin\Theta_3)^2\right]^{0.5}-\left[(Mx_2+AB/2+BC*\cos\Theta_2+CD*\cos\Theta_3+DE*\cos\Theta_4)^2+(My_2-BC*\sin\Theta_2-CD*\sin\Theta_3-DE*\sin\Theta_4)^2\right]^{0.5}=C*(DTOA_{DE}-DTOE_{DE}) \quad (3)$$

$$Mx_2=Mx_1-|\text{vector}_{12}|*\cos(\theta_{12}+\theta_1) \quad (4)$$

$$My_2=My_1+|\text{vector}_{12}|*\sin(\theta_{12}+\theta_1) \quad (5)$$

A person skilled in the art probably appreciates that equations (1), (2), and (3) above are associated with hyperbolas, with baselines AB, BC, and DE, respectably; and equations (4) and (5) are associated with the mobile device movement from $M_1$ to $M_2$, wherein $|vector_{12}|$ is the magnitude of $vector_{12}$.

Once been resolved: the mobile position ($Mx_1$, $My_1$), and the rotation angle ($O_1$) between the beacon and the mobile coordinate systems, the mobile device can easily determine the distance and direction to the beacon in its own coordinate system.

According to a 3rd embodiment of the present invention, the beacon is a Bluetooth tag, specifically transmitting Bluetooth advertising signals, comprising accelerometer and magnetometer, such that its acceleration measurements are reported in the beacon local coordinate system, which rotation angle relatively to the mobile coordinate system is known. Further, at the mobile device, DAOA measurements are employed for localization of the beacon, using a single omnidirectional antenna.

FIG. 6 illustrates a method for Localization of a moving beacon according to a 3rd embodiment of the present invention. In the background, two 2D cartesian coordinate systems are depicted: the beacon (tag) coordinate system ($X_T$-$Y_T$), drafted in thin lines, and the mobile coordinate system ($X_M$-$Y_M$), drafted in thicker lines. A beacon is depicted in locations: A, B, and C, and a mobile device is depicted in location: $M_1$, wherein the $X_T$-$Y_T$ coordinates thereof are:

$$M_1\,(Mx_1,\,My_1),$$

$$A\,(AB/2,\,0),$$

$$B\,(-AB/2,\,0),$$

$$C\,(-AB/2-BC*\cos\Theta_2,\,BC*\sin\Theta_2),$$

and:

$\Theta_2$ is the angle between BC and AB, $\Theta_3$, $\Theta_4$ and $\Theta_5$ are angles in triangle $ABM_1$, $\Theta_6$, $\Theta_7$ and $\Theta_8$ are angles in triangle $BCM_1$.

Also, according to this embodiment, the beacon coordinate system ($X_T$-$Y_T$) is defined after the beacon locations A and B, such that the $X_T$ axis is aligned with AB, and the $Y_T$ axis perpendicularly crossing the $X_T$ axis, at the middle of AB, such that the mobile coordinate system ($X_M$-$Y_M$) is shifted by $My_1$ and $Mx_1$, and rotated clockwise by $\theta_1$, relatively to the beacon coordinate system ($X_T$-$Y_T$).

Preferably, according to the disclosed method, the beacon radio signals contain an unmodulated part, or a part modulated according to a predefined pattern; and the signal RF phase is synchronized with the signal rising edge of at least one modulated bit; and wherein the mobile device is further configured to determine the time of arrival of said at least one bit, and measure the RF phase of the signal at said part; enabling the mobile device to determine at least one of: ToA or DToA, or AoA or DAoA.

According to the 3rd embodiment of the invention, the beacon transmits periodic Bluetooth advertising signals, said periodic radio signals configured to contain an unmodulated part, named CTE (Constant Tone Extension), and set the RF phase to zero at the rising edge of the first preamble bit, as illustrated in FIG. 13. At the mobile device, the time of arrival of this bit is determined, and the RF phase at the CTE is measured, and compared with respect to all the beacon signals detected.

FIG. 13 illustrates the signal Constant Tone Extension according to a preferred embodiment of the, which according to the Bluetooth specifications, specifically the Bluetooth advertising signals, is an unmodulated (aka CW=Continuous Wave) part of the Bluetooth advertising signals. At the upper part of the picture, the BLE Link Layer advertising packet format is depicted, comprising: preamble, access address, PDU, CRC and Constant Tone Extension (CTE).

Indicated above the packet block is that according to a preferred embodiment, at the rising edge of the first preamble bit, the RF (2.4 GHz) phase is set to zero.

Further below the advertising packet block, other blocks depict the sampling structure of the CTE, showing two sampling rates: 1 μs (second from bottom block) and 2 μs (lower block).

In both cases, the Guard Period and Reference Period are 4 μs and 8 μs respectively.

Then, according to the 3rd embodiment of the invention, upon detecting the beacon signals transmitted from three locations: A, B, and C, the distances AB and BC are estimated at the mobile device by integrating the communicated acceleration magnitude, considering the estimated time of movement.

Angle $\theta_2$ (in FIG. 6) can also be determined at the mobile device, based on the acceleration direction reported by the beacon from locations: A, B, and C.

In addition, angles $\theta_3$ and $\theta_6$ can be determined at the mobile device, by DAoA, employing Bluetooth IQ sampling on the CTE part of the Bluetooth advertising signals, and comparing accurate time stamping and phase measurements, associated with signals transmitted from locations: A, B and C.

Then, at the mobile device, a set of equations can be drafted and resolved, comprising, with respect to FIG. 6:

Knowns $\theta_1$, $\theta_2$, $\theta_3$, $\theta_6$, AB, BC

Unknowns $Mx_1$, $My_1$, (Mobile coordinates in $X_T$-$Y_T$ system), $\theta_4$, $\theta_5$, $\theta_7$, $\theta_8$ Equations $$\sin\theta_4 * AB / \sin\theta_3 = \sin\theta_8 * BC / \sin\theta_6; \quad (1)$$

(sine law in triangles $ABM_1$ and $BCM_1$)

$$180° = \theta_3 + \theta_4 + \theta_5 \quad (2)$$

$$180° = \theta_6 + \theta_7 + \theta_8 \quad (3)$$

$$180° = \theta_2 + \theta_7 + \theta_5 \quad (4)$$

$$My_1 = AB * (\sin\theta_5 * \sin\theta_4) / \sin(\theta_5 + \sin\theta_4); \quad (5)$$

(the triangulation equation)

$$Mx_1 = -AB/2 - My_1 / \tan(\theta_2 + \theta_7) \quad (6)$$

Upon resolving the mobile position ($Mx_1$, $My_1$), and knowing the rotation angle ($\theta_1$) between the beacon and the mobile coordinate systems, the mobile device can easily determine the distance and direction to the beacon in its own coordinate system.

According to a 4th embodiment of the present invention, the beacon is a Bluetooth tag, specifically transmitting Bluetooth advertising signals, comprising accelerometer but no magnetometer, so its acceleration measurements are reported in the beacon local coordinate system, which rotation angle relatively to the mobile coordinate system is unknown. Further, at the mobile device, DAOA measurements are employed for localization of the beacon, using a single omnidirectional antenna.

FIG. 7 illustrates a method for Localization of a moving beacon according to a 4th embodiment of the present invention. In the background, two 2D cartesian coordinate systems are depicted: the beacon (tag) coordinate system ($X_T$-$Y_T$), drafted in thin lines, and the mobile coordinate system ($X_M$-$Y_M$), drafted in thicker lines. A beacon is depicted in locations: A, B, C, D, and E, and a mobile device is depicted in locations: $M_1$ and $M_2$, wherein the $X_T$-$Y_T$ coordinates thereof are:

$$M_1(Mx_1, My_1),$$

$$M_2(Mx_2, My_2),$$

$$A(AB/2, 0),$$

$$B(-AB/2, 0),$$

$$C(-AB/2 - BC*\cos\Theta_2, BC*\sin\Theta_2),$$

$$D(-AB/2 - BC*\cos\Theta_2 - CD*\cos\Theta_3, BC*\sin\Theta_2 + CD*\sin\Theta_3)$$

$$E(-AB/2 - BC*\cos\Theta_2 - CD*\cos\Theta_3 - DE*\cos\Theta_4, BC*\sin\Theta_2 + CD*\sin\Theta_3 + DE*\sin\Theta_4)$$

and:

$\Theta_2$ is the angle between BC and $X_T$, $\Theta_9$ is the angle between CD and $X_T$, $\Theta_{10}$ is the angle between DE and $X_T$, $\Theta_{12}$ is the angle between the line connecting $M_1$ and $M_2$, and the $X_M$ axis.

$\Theta_2$ is the angle between BC and AB, $\Theta_3$, $\Theta_4$ and $\Theta_5$ are angles in triangle $ABM_1$, $\Theta_6$, $\Theta_7$ and $\Theta_8$ are angles in triangle $BCM_1$, $\Theta_{11}$ is the angle in triangle $DEM_2$ headed at $M_2$.

The movement of the mobile device from $M_1$ to $M_2$ is depicted by a dotted line with arrow pointing to $M_2$, marked as $vector_{12}$, implying that it indicates a magnitude and a direction.

Also, according to this embodiment, the beacon coordinate system ($X_T$-$Y_T$) is defined after the beacon locations A and B, such that the $X_T$ axis is aligned with AB, and the $Y_T$ axis perpendicularly crossing the $X_T$ axis, at the middle of AB, such that the mobile coordinate system ($X_M$-$Y_M$) is shifted by $My_1$ and $Mx_1$, and rotated clockwise by $\theta_1$, relatively to the beacon coordinate system ($X_T$-$Y_T$).

According to the 4th embodiment of the invention, $\theta_1$ is unknown, since the beacon does not comprise a magnetometer, and the directions measured in the beacon coordinate system are not associated with the magnetic North.

According to the 4th embodiment of the invention, the beacon transmits periodic Bluetooth advertising signals, configured to contain an unmodulated part, named CTE, and with RF phase set to zero at the first preamble bit, as illustrated in FIG. 13, enabling the mobile device to measure DAOA, by analyzing IQ samples of the received CTE, and determining the time of arrival of the first preamble bit, of signals transmitted from locations: A, B, C, D, and E, employing a single omnidirectional antenna at the beacon, and a single omnidirectional antenna at the mobile device.

Then, according to the 4th embodiment of the invention, upon detecting the beacon signals communicating the beacon acceleration measured at locations: A, B, C, D and E, the distances AB, BC, CD and DE are estimated at the mobile device by integrating the communicated acceleration magnitude, considering the estimated time of movement. Also, angles $\theta_2$, $\theta_9$ and $\theta_{10}$ (in FIG. 7) can be determined at the mobile device, based on the acceleration direction reported by the beacon.

In addition, angles $\theta_3$, $\theta_6$ and $\theta_{11}$ can be measured at the mobile device, employing the Bluetooth IQ sampling technique, and comparing accurate time stamping and phase measurements, associated with signals transmitted from locations: A, B, C, D and E.

Also, vector$_{12}$, specifying the magnitude ($M_1M_2$) and direction ($\theta_{12}$) of the movement of the mobile device from $M_1$ to $M_2$, is determined at the mobile device, relatively to the mobile coordinate system, based on measurements made using an internal accelerometer and magnetometer, comprised in the mobile device according to this 4th embodiment.

Then, at the mobile device, a set of equations can be drafted and resolved, comprising, with respect to FIG. 7:

Knowns $\theta_2$, $\theta_3$, $\theta_6$, $\theta_9$, $\theta_{10}$, $\theta_{11}$, $\theta_{12}$, AB, BC, CD, DE, vector$_{12}$ (magnitude and magnetic direction)

Unknowns $Mx_1$, $My_1$, $Mx_2$, $My_2$ (Mobile coordinates in $X_T$-$Y_T$ System), $\theta_1$, $\theta_4$, $\theta_5$, $\theta_7$, $\theta_8$ Equations $$\sin\theta_4 * AB / \sin\theta_3 = \sin\theta_8 * BC / \sin\theta_6; \tag{1}$$

(sine law in triangles $ABM_1$ and $BCM_1$)

$$180° = \theta_3 + \theta_4 + \theta_5 \tag{2}$$

$$180° = \theta_6 + \theta_7 + \theta_8 \tag{3}$$

$$180° = \theta_2 + \theta_7 + \theta_5 \tag{4}$$

$$My_1 = AB * (\sin\theta_5 * \sin\theta_4) / \sin(\theta_5 + \sin\theta_4); \tag{5}$$

(the triangulation equation)

$$Mx_1 = -AB/2 - My_1 / \tan(\theta_2 + \theta_7) \tag{6}$$

-continued $$Mx_2 = Mx_1 - |\text{vector}_{12}| * \cos(\theta_{12} + \theta_1) \tag{7}$$

$$My_2 = My_1 + |\text{vector}_{12}| * \sin(\theta_{12} + \theta_1) \tag{8}$$

$$DE^2 = DM_2^2 + EM_2^2 - 2 * DM_2 * EM_2 * \cos(\theta_{11}); \tag{9}$$

(cosine law in triangle $DEM_2$)

Upon resolving the mobile position and the rotation angle ($\theta_1$, the mobile device can easily determine the distance and direction to the beacon in its own coordinate system.

According to a 5th embodiment of the present invention, the beacon is a Bluetooth tag, specifically transmitting Bluetooth advertising signals, comprising accelerometer but no magnetometer, so its acceleration measurements are reported in the beacon local coordinate system, which rotation angle relatively to the mobile coordinate system is unknown. Further, at the mobile device, AOA measurements are employed for localization of the beacon, using an antenna array.

FIG. 8 illustrates a method for Localization of a moving beacon according to a 5th embodiment of the present invention. In the background, two 2D cartesian coordinate systems are depicted: the beacon (tag) coordinate system ($X_T$-$Y_T$), drafted in thin lines, and the mobile coordinate system ($X_M$-$Y_M$), drafted in thicker lines. A beacon is depicted in locations: A, B, and C, and a mobile device is depicted in location: $M_1$, wherein the $X_T$-$Y_T$ coordinates thereof are:

$$M_1(Mx_1, My_1),$$

$$A(AB/2, 0),$$

$$B(-AB/2, 0),$$

$$C(-AB/2 - BC * \cos\Theta_2, BC * \sin\Theta_2),$$

and:

$\Theta_2$ is the angle between BC and $X_T$, $\Theta_3$, $\Theta_4$ and $\Theta_5$ are angles in triangle $ABM_1$, $\Theta_6$, $\Theta_7$ and $\Theta_8$ are angles in triangle $BCM_1$.

Also, according to this embodiment, the beacon coordinate system ($X_T$-$Y_T$) is defined after the beacon locations A and B, such that the $X_T$ axis is aligned with AB, and the $Y_T$ axis perpendicularly crossing the $X_T$ axis, at the middle of AB, such that the mobile coordinate system ($X_M$-$Y_M$) is shifted by $My_1$ and $Mx_1$, and rotated clockwise, relatively to the beacon coordinate system ($X_T$-$Y_T$).

According to the 5th embodiment of the invention, the angle of rotation between the two coordinate system: ($X_T$-$Y_T$) and ($X_M$-$Y_M$), is unknown.

Furthermore, according to this embodiment, the beacon does not comprise a magnetometer, however the mobile device comprises a magnetometer, and an antenna array, enabling measuring AoA, i.e., determining the direction from the mobile device to the beacon, relatively to the magnetic North.

According to the 5th embodiment of the invention, the beacon transmits periodic Bluetooth advertising signals, said periodic radio signals configured to contain an unmodulated part, known in the art and referred in the Bluetooth specifications as CTE (Constant Tone Extension), and set the RF phase to zero at the rising edge of the first preamble bit, as illustrated in FIG. 13. Then, the mobile device is configured to accurately determine the time of arrival of the first preamble bit, and perform IQ sampling on the CTE part of the burst, and determine AoA of the signal based on the difference in phase measured though the different antenna elements of the antenna array.

It should be noted that present art methods typically employ two such AoA measurements, from two different locations of the mobile device, to fix the direction and distance to a static beacon; however, according to this 5th embodiment of the present invention, the distance and direction to a moving beacon can be fixed at a mobile device, from a single location, as detailed followingly.

According to the 5th embodiment of the invention, upon detecting the beacon signals transmitted from locations: A, B, and C, the distances AB and BC are estimated at the mobile device based on the reported beacon acceleration, considering the estimated time of movement. Angle $\theta_2$ (in FIG. 8) can also be determined at the mobile device, based on the acceleration direction reported by the beacon from locations: A, B, and C.

In addition, angles $\theta_3$ and $\theta_6$ can be determined at the mobile device, comparing AoA of signals transmitted from locations: A, B and C.

Then, at the mobile device, a set of equations can be drafted and resolved, comprising, with respect to FIG. 8:

Knowns $\theta_2$, $\theta_3$, $\theta_6$, AB, BC, direction to tag (in the mobile coordinate system)

Unknowns $M_1B$ (distance from mobile to tag at location B), $\theta_4$, $\theta_5$, $\theta_7$, $\theta_8$ Equations $$M_1B = \sin\theta_4 * AB / \sin\theta_3; \quad (1)$$

(sine law in triangle $ABM_1$)

$$M_1B = \sin\theta_8 * BC / \sin\theta_6; \quad (2)$$

(sine law in triangle $BCM_1$)

$$180° = \theta_3 + \theta_4 + \theta_5 \quad (3)$$

$$180° = \theta_6 + \theta_7 + \theta_8 \quad (4)$$

$$180° = \theta_2 + \theta_7 + \theta_5 \quad (5)$$

Hence, the distance from the mobile to the tag: $M_1B$ is resolved, as well as the direction to the tag since the mobile device comprises a magnetometer, so its measured AoA to the tag directly provides the magnetic direction to the tag.

Preferably, the disclosed method further comprises the steps of, at the mobile device:

a. acquiring self-position relatively to a global coordinate system;

b. determining the beacon position relatively to said global coordinate system;

c. communicating the beacon global position to another mobile device or to a remote server.

As known in the art, this latter function enables tracking a low power transmitting beacon over very large areas, far beyond the direct communication range between the beacon and a nearby mobile device, practically worldwide, typically using the Internet over cellular networks.

The present invention also discloses a radio beacon trackable by a mobile device, said beacon comprising: an accelerometer, a transmitter and a controller; said beacon configured to measure a momentary acceleration relatively to a locally defined coordinate system, and periodically broadcast signals communicating said measured acceleration; and configured to enable the mobile device to measure at least one of: the Difference in Time of Arrival (DToA) or Difference in Angle of Arrival (DAoA) between these signals, or Time of Arrival (ToA) or Angle of Arrival (AoA) of these signals; and enable the mobile device to determine the distance and direction to the beacon, based on said acceleration measurement, and on said measured at least one of: DToA or DAoA or ToA or AoA.

Preferably, the disclosed beacon further comprises a magnetometer, and the direction is measured at the beacon relatively to the earth magnetic North.

Preferably, the disclosed beacon is Bluetooth complaint, configured to broadcast Bluetooth advertising signals, at a Difference in Time of Emission (DToE) selectable from a set of discrete values. Furthermore, said DToE is configured to change from time to time in a pseudorandom pattern.

According to a 1st embodiment and to a 2nd embodiment, the disclosed beacon is Bluetooth complaint, configured to broadcast periodic Bluetooth advertising signals, at a Difference in Time of Emission (DToE) set to [is +m*0.625 ms], wherein m is an integer number with range 0-16, changed from one Bluetooth advertising to another, in a pseudorandom pattern, as illustrated in FIGS. 4, 5 and 12.

Preferably, the beacon periodic signals contain an unmodulated part, or a part modulated according to a predefined pattern; and wherein the signal RF phase is synchronized with the signal rising edge of at least one modulated bit; enabling the mobile device to determine the time of arrival of said at least one bit, and measure the RF phase of the signal at said part, or differences thereof.

According to a 3rd embodiment and a 4th embodiment and a 5th embodiment, the disclosed beacon is Bluetooth complaint, configured to broadcast periodic Bluetooth advertising signals, wherein said periodic radio signals contain an unmodulated part, as per the Bluetooth Constant Tone Extension (CTE) specifications, and the RF phase of the transmitted signals is set to zero at the rising edge of the first preamble bit, as illustrated in FIG. 13. The beacon localization method according to the 3rd, 4th, and 5th embodiments, is illustrated in FIGS. 6, 7, and 8.

FIG. 10 illustrates a Block Diagram of a radio beacon according to a preferred embodiment of the present invention. The main block, indicating inside "Bluetooth system on chip (SOC)", comprises two solid-line blocks, one marked "Controller" and the other marked "Transmitter", the latter shown coupled to an antenna. Outside the SOC, three additional blocks are depicted, all coupled to the controller: "accelerometer", "geo magnetic sensor" (aka magnetometer), and "barometer". Practically, the Bluetooth SOC comprises both a transmitter and a receiver, i.e., transceiver.

According to a 1st embodiment and a 3rd embodiment of the present invention, the disclosed beacon comprises an accelerometer and a magnetometer.

According to a 2nd embodiment and a 4th embodiment and a 5th embodiment of the invention, the disclosed beacon comprises an accelerometer but does not comprise a magnetometer.

The present invention further discloses a mobile device for tracking a radio beacon, said device comprising: a receiver, an accelerometer, and a controller; said device configured to detect signals transmitted by the beacon indicating the momentary acceleration of the beacon relatively to the beacon local coordinate system; and to measure at least one of: the Difference in Time of Arrival (DToA) or Difference in Angle of Arrival (DAoA) between these signals, or Time of Arrival (ToA) or Angle of Arrival (AoA) of these signals; and determine the distance and direction to the beacon, based on said communicated acceleration measurement, and on said measured: DToA or DAoA or ToA or AoA.

Preferably, the disclosed mobile device is further configured to measure the distance and direction of its own movement, and use these measurements in at least one of: determining the distance and direction to the beacon, or determining the movement direction of the beacon in the mobile coordinate system.

Preferably, the disclosed mobile device further comprises a magnetometer, and configured to measure the direction relatively to the magnetic North.

Possibly, the disclosed mobile device could further comprise an antenna array coupled to said receiver, and configured to determine the direction to the beacon, in the mobile coordinate system, by measurement of AoA.

Preferably, the disclosed mobile device is configured to scan for Bluetooth advertising signals.

Preferably, the disclosed mobile device further comprises a GNSS receiver, and comprises or coupled to long range communication means; and configured to report the position of the beacon by said communication means, relatively to a global coordination system.

FIG. 11 illustrates a Block Diagram of a mobile tracking device according to a preferred embodiment of the present invention. The main block, indicating inside "mobile smartphone", comprises a block named "controller", to which all other blocks are coupled: "display", "keyboard", "magnetometer", "barometer", "accelerometer", "short range transceiver" (+ antenna), "long range transceiver" (+ antenna), and "GNSS receiver" (+ antenna).

Preferably, the "short range transceiver" is Bluetooth compliant, and the "long range transceiver" is 4G/5G/6G cellular.

According to a $2^{nd}$ embodiment and to a $4^{th}$ embodiment of the present invention, the disclosed mobile device comprises an accelerometer and a magnetometer, and configured to measure the distance and direction of its own movement, and use these measurements in determining the distance and direction to the beacon, and determining the movement direction of the beacon in the mobile coordinate system.

According to a $5^{th}$ embodiment of the present invention, the disclosed mobile device comprises an antenna array with two antenna elements, coupled to the receiver, in addition to a magnetometer, and configured to determine the magnetic direction to the beacon, by measurement of AoA relatively to the magnetic North.

Finally, FIG. 9 illustrates a Display at a mobile device tracking a beacon according to a preferred embodiment of the present invention. A hand-held mobile device is illustrated, on which a dotted curved line is displayed, starting by a person icon, and pointing to a beacon icon. Asides the dotted line, appears a text indicating the distance and elevation to the beacon.

For purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks.

While devices and methods have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims, which satisfy the statutory subject matter requirements.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel.

Although the disclosure has been shown and described with respect to one or more implementations, equivalent alterations and modifications will occur based on a reading and understanding of this specification and the annexed drawings. The disclosure includes all such modifications and alterations and is limited only by the scope of the following claims.

The invention claimed is:

1. A method for tracking a radio beacon, by a mobile device, comprising the steps of:

a. at the radio beacon, defining a beacon coordinate system (XT-YT) with origin at the beacon centre;

b. at the radio beacon, at each different location: location (A), location (B), and location (C), measuring a momentary acceleration, and broadcasting a radio signal indicating said acceleration measurement;

c. at the mobile device, defining a mobile coordinate system (XM-YM) with origin at the mobile device centre;

d. at the mobile device, at location (M1), detecting the signals transmitted by the beacon from: location (A), location (B) and location (C), including the beacon acceleration measurement; and measuring at least one of: the Difference in Time of Arrival (DToA) or Difference in Angle of Arrival (DAoA) between these signals, or Time of Arrival (ToA) or Angle of Arrival (AoA) of these signals;

e. at the mobile device, transforming the acceleration measurement, from the beacon coordinate system to the mobile coordinate system;

f. at the mobile device, at location (M1), determining the distance and direction to the beacon, based on the beacon acceleration measurement, and on said measured at least one of: ToA or DToA or DAoA or AoA, by solving a set of equations wherein distance of movement of the beacon is estimated by integrating its communicated acceleration measurement by time of movement.

2. The method according to claim 1, wherein at least one:

a. the radio beacon coordinate system and the mobile device coordinate system are aligned; or b. the direction at least at one of: the beacon or the mobile device, is measured relatively to the earth magnetic North.

3. The method according to claim 1, wherein said radio signals are broadcast by the beacon at a Difference in Time of Emission (DToE) selectable from a set of values known to the mobile device.

4. The method according to claim 3, wherein said DToE is changed from time to time in a pseudorandom pattern.

5. The method according to claim 1, wherein the radio signals broadcast by the beacon are Bluetooth advertising signals.

6. The method according to claim 1, wherein said radio signals contain an unmodulated part, or a part modulated according to a predefined pattern; and the signal RF phase is synchronized with the signal rising edge of at least one modulated bit; and wherein the mobile device is further configured to determine the time of arrival of said at least one bit, and measure the RF phase of the signal at said part, enabling the mobile device to determine at least one of: ToA or DToA, or AoA or DAoA.

7. The method according to claim 1, further comprising the steps of:

a. at the radio beacon, at each different location: location (D), and location (E), measuring a momentary acceleration, and broadcasting a radio signal indicating said acceleration measurement;

b. at the mobile device, moving from location (M1) to location (M2), and measuring the distance and direction therebetween;

c. at the mobile device, at location (M2), detecting the signals transmitted by the beacon from: location (D) and location (E), including the beacon acceleration measurement, and measuring at least one of: the Difference in Time of Arrival (DToA) or Difference in Angle of Arrival (DAoA) between these signals, or Time of Arrival (ToA) or Angle of Arrival (AoA) of these signals;

d. at the mobile device, at location (M2), determining the distance and direction to the beacon, based on the beacon acceleration, and on the measured at least one of: DToA or DAoA or ToA or AoA.

8. The method according to claim 1, further comprising the steps of, at the mobile device:

a. acquiring self-position coordinates in a global coordinate system;

b. determining the beacon position in said global coordinate system;

c. communicating the beacon global position to another mobile device or to a remote server.

9. A radio beacon trackable by a mobile device, said beacon comprising: an accelerometer, a transmitter and a controller; said beacon configured to measure a momentary acceleration in a locally defined coordinate system (XT-YT) with origin at the beacon centre, and periodically broadcast signals communicating said measured acceleration; and configured to enable the mobile device to measure at least one of: the Difference in Time of Arrival (DToA) or Difference in Angle of Arrival (DAoA) between these signals, or Time of Arrival (ToA) or Angle of Arrival (AoA) of these signals in a mobile coordinate system (XM-YM) with origin at the mobile device centre; and enable the mobile device to determine the distance and direction to the beacon, based on said acceleration measurement, and on said measured at least one of: DToA or DAoA or ToA or AoA, by solving a set of equations wherein distance of movement of the beacon is estimated by integrating its communicated acceleration measurement by time of movement.

10. The beacon according to claim 9, further comprising a magnetometer, and wherein the direction is measured at the beacon relatively to the earth magnetic North.

11. The beacon according to claim 9, wherein said periodic radio signals are broadcast at a Difference in Time of Emission (DToE) selectable from a set of values known to the mobile device.

12. The beacon according to claim 11, wherein said DToE is configured to change from time to time in a pseudorandom pattern.

13. The beacon according to claim 9, wherein said periodic radio signals contain a part modulated according to a predefined pattern; and wherein the signal RF phase is synchronized with the signal rising edge of at least one modulated bit; enabling the mobile device to determine the time of arrival of said at least one bit, and the RF phase of the signal at said part.

14. The beacon according to claim 9, in which said transmitter is configured to broadcast Bluetooth advertising.

15. A mobile device for tracking a radio beacon, said device comprising: a receiver, an accelerometer, and a controller; said device configured to detect signals transmitted by the beacon indicating a momentary acceleration of the beacon measured in a beacon local coordinate system (XT-YT) with origin at the beacon centre; and to measure at least one of: the Difference in Time of Arrival (DToA) or Difference in Angle of Arrival (DAoA) between these signals, or Time of Arrival (ToA) or Angle of Arrival (AoA) of these signals; and determine the distance and direction to the beacon based on said communicated acceleration measurement, and on said measured at least one of: DToA or DAoA or ToA or AoA, by solving a set of equations wherein distance of movement of the beacon is estimated by integrating its communicated acceleration measurement by time of movement.

16. The device according to claim 15, further configured to measure the distance and direction of its own movement, and use these measurements in at least one of: determining the distance and direction to the beacon, or determining the movement direction of the beacon in the mobile coordinate system.

17. The device according to claim 15, further comprising a magnetometer, and configured to measure the direction relatively to the magnetic North.

18. The device according to claim 15, further comprising an antenna array coupled to said receiver, and configured to determine the direction to the beacon, by measurement of AoA.

19. The device according to claim 15, in which said receiver is configured to scan for Bluetooth advertising signals.

20. The device according to claim 15, further comprising a GNSS receiver, and comprising or coupled to long range communication means; and configured to report the position of the beacon by said communication means, relatively to a global coordination system.

* * * * *